United States Patent
Rennig et al.

(10) Patent No.: US 11,853,252 B2
(45) Date of Patent: Dec. 26, 2023

(54) PROCESSING SYSTEM, RELATED INTEGRATED CIRCUIT, DEVICE AND METHOD

(71) Applicants: STMicroelectronics Design & Application S.R.O., Prague (CZ); STMicroelectronics Application GMBH, Aschheim-Dornach (DE)

(72) Inventors: Fred Rennig, Nandlstadt (DE); Vaclav Dvorak, Mratín (CZ)

(73) Assignees: STMicroelectronics Application GMBH, Aschheim-Dornach (DE); STMicroelectronics Design & Application S.R.O., Prague (CZ)

( * ) Notice: Subject to any disclaimer, the term of this patent is extended or adjusted under 35 U.S.C. 154(b) by 0 days.

(21) Appl. No.: 17/819,749

(22) Filed: Aug. 15, 2022

(65) Prior Publication Data
US 2023/0053798 A1 Feb. 23, 2023

(30) Foreign Application Priority Data
Aug. 20, 2021 (IT) .................. 102021000022124

(51) Int. Cl.
*G06F 13/42* (2006.01)
*G06F 13/28* (2006.01)
(Continued)

(52) U.S. Cl.
CPC ...... *G06F 13/4282* (2013.01); *G06F 9/30134* (2013.01); *G06F 13/28* (2013.01); *G06F 13/4072* (2013.01)

(58) Field of Classification Search
None
See application file for complete search history.

(56) References Cited

U.S. PATENT DOCUMENTS

| 5,970,069 A | 10/1999 | Kumar et al. |
| 10,678,726 B2 | 6/2020 | Rennig et al. |

(Continued)

OTHER PUBLICATIONS

ST Life Augmented, EMEA APG Marketing & Application, "CAN FD Light Network Protocol and Implementation", EuES003-06 version 1.3, Sep. 17, 2019, 22 pages.

(Continued)

*Primary Examiner* — Ilwoo Park
*Assistant Examiner* — Christopher A Bartels
(74) *Attorney, Agent, or Firm* — Slater Matsil, LLP

(57) ABSTRACT

A processing system includes a transmission terminal configured to provide a transmission signal, a reception terminal configured to receive a reception signal, a microprocessor programmable via software instructions, a memory controller configured to be connected to a memory, a serial communication interface, and a communication system. Specifically, the serial communication interface supports a CAN FD Light mode of operation and a UART mode of operation. For this purpose, the serial communication interface comprises a control register, a clock management circuit, a transmission shift register, a transmission control circuit, a reception shift register and a reception control circuit. Accordingly, the microprocessor can transmit and/or receive CAN FD Light or UART frames via the same serial communication interface.

20 Claims, 8 Drawing Sheets

(51) Int. Cl.
  *G06F 13/40* (2006.01)
  *G06F 9/30* (2018.01)

(56) References Cited

U.S. PATENT DOCUMENTS

| | | |
|---|---|---|
| 11,366,778 B2 | 6/2022 | Rennig et al. |
| 2014/0359179 A1 | 12/2014 | Aue et al. |
| 2017/0218745 A1* | 8/2017 | Erdos ................ E21B 44/00 |
| 2021/0073167 A1 | 3/2021 | Dehamel |
| 2021/0357344 A1* | 11/2021 | Rennig ............ G06F 11/0739 |
| 2022/0191059 A1 | 6/2022 | Rennig et al. |
| 2022/0286319 A1 | 9/2022 | Rennig et al. |
| 2022/0308892 A1* | 9/2022 | Colombo ............. G06F 21/76 |
| 2023/0053564 A1* | 2/2023 | Dvorak ............. G06F 13/4282 |

OTHER PUBLICATIONS

Bosch, "CAN FD Light: Specification released", CAN in Automation (CiA), CAB FD Light Specification and test plan, 604-1, v. 0.0.6, Sep. 21, 2021, 2 pages.

International Standard, "Road vehicles—Controller area network (CAN)—Part 2: High-speed medium access unit", ISO 11898-2: ISO/TC 22/SC 3/WG 1/TF 6, Dec. 2016, 22 pages.

ST Life Augmented, RM0407 Reference manual, "SPC58 C Line—32 bit Power Architecture automotive MCU Dual z4 cores 180 MHz, 4 MBytes Flash, HSM, ASIL-B", Rev. 7, Apr. 2021, 2856 pages.

International Standard, "Road vehicles Controller area network (CAN) Part 1: Data link layer and physical signaling", ISO 11898-1:2015, Dec. 2015, 74 pages.

\* cited by examiner

PROCESSING SYSTEM, RELATED INTEGRATED CIRCUIT, DEVICE AND METHOD

CROSS-REFERENCE TO RELATED APPLICATIONS

This application is a translation of and claims the priority benefit of Italian patent application number 10 2021 000022124, filed on Aug. 20, 2021, entitled, "Processing System, Related Integrated Circuit, Device and Method" which is hereby incorporated herein by reference to the maximum extent allowable by law.

TECHNICAL FIELD

Embodiments of the present disclosure relate to a microcontroller configured to exchange data via a CAN FD bus.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a microcontroller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Antilock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, in particular a microcontroller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. For example, the system bus may comprise one or more bus systems, e.g., based on the Advanced eXtensible Interface (AXI) bus architecture, and/or a Network-on-Chip (NoC).

Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of: one or more communication interfaces IF, e.g., for exchanging data via the communication system 20, such as a Universal asynchronous receiver/transmitter (UART), Serial Peripheral Interface Bus (SPI), Inter-Integrated Circuit (I2C), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Generally, a dedicated digital components DC may also correspond to a FPGA integrated in the processing system 10. For example, in this case, the memory 104 may also comprise the program data for such a FPGA.

For example, for this purpose, the system bus may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

As mentioned before, in many applications, data have to be exchanged between several processing systems 10. For example, in the automotive sector, and also in many other areas, one or more CAN buses are often used to exchange data between processing systems 10. More specifically, in many applications, the processing system 10 should be connected to a CAN FD Light bus. For example, the CAN FD Light protocol is described in documents, "*CAN FD Light Specification and test plan*", CAN in Automation (CiA) 604-1, version 0.0.6, or "*CAN FD Light Network Protocol and Implementation*", EuES003-06, version 1.3, which are incorporated herein by reference.

For example, each of the processing systems $10_1$ and $10_2$, may comprise: a CAN FD bus transceiver 320 configured to be connected to the CAN bus 20; a processing unit 102; and a communication interface IF configured to connect the processing unit 102 to the CAN bus transceiver 320.

For example, such additional CAN bus transceivers 320 are usually required, because the CAN bus 20 uses different signal levels than the processing unit 102 and/or in order to implement a galvanic isolation. For example, in case of the CAN FD Light protocol, the transceivers 320 are Controller Area Network Flexible Data-Rate (CAN FD) transceivers.

For example, conventional CAN bus transceivers 320 comprises two interfaces. The first interface is configured to exchange data via the CAN bus 20 by transmitting and receiving differential non-return-to-zero (NRZ) encoded signals. Conversely, the second interface is configured to receive a transmission signal Tx and provide a reception signal Rx, wherein the transmission signal Tx and the reception signal Rx are NRZ signals, preferably unipolar non-return-to-zero level (NRZ-L) encoded signals, such as binary-encoded signals being set to high (typically the supply voltage of the processing unit 102) for transmitting a logic "1" or low (typically ground) for transmitting a logic "0".

Accordingly, the communication interface IF may provide the NRZ/binary encoded transmission signal TX to the transceiver 320 and receive the NRZ/binary encoded reception signal RX from the transceiver 320. In turn, the transceiver 320 manages the data exchange on the CAN bus 20. Accordingly, the communication interface IF implements (at least) the data link layer and optional further higher protocol layers, while the transceivers 320 manages the physical layer. Accordingly, the interface IF may implement a CAN FD Light controller.

As shown in FIG. 3, the transceivers 320 may be provided in the form of a separate integrated circuit 32 connected to an integrated circuit 30 comprising the processing unit 102, and the hardware interface IF (see, e.g., processing system $10_1$), or the transceivers 320 may be integrated in the integrated circuit 30 comprising the processing unit 102, and the hardware interface IF (see, e.g., processing system $10_2$). Generally, the CAN FD Light controller IF may also be integrated in the integrated circuit 32 of the transceiver 320.

SUMMARY

In view of the above, it is an objective of various embodiments of the present disclosure to provide solutions for implementing a CAN FD Light controller in a micro-controller.

According to one or more embodiments, one or more of the above objectives is achieved by means of a processing system having the features specifically set forth in the claims that follow. Embodiments moreover concern a related integrated circuit, device and method.

The claims are an integral part of the technical teaching of the disclosure provided herein.

As mentioned before, various embodiments relate to a processing system, such as an integrated circuit, e.g., a micro-controller, adapted to transmit and receive CAN FD Light frames. In various embodiments, the processing system comprises a transmission terminal configured to provide a transmission signal and a reception terminal configured to receive a reception signal. The processing system comprises also a microprocessor programmable via software instructions, a memory controller configured to be connected to a memory, a serial communication interface, and a communication system connecting the microprocessor, the memory controller and the serial communication interface.

Specifically, in various embodiments, the serial communication interface supports both a CAN FD Light mode of operation and a UART mode of operation.

For this purpose, the serial communication interface comprises a control register configured to store data identifying a clock scaling factor, data identifying a requested number of bits and data identifying a mode of operation, wherein the mode of operation indicates the CAN FD Light mode or the UART mode. In various embodiments, the control register is programmable via the microprocessor.

In various embodiments, the serial communication interface comprises a clock management circuit configured to receive a clock signal and generate a down-scaled clock signal as a function of the clock scaling factor stored to the control register.

In various embodiments, in order to implement the serial data transmission, the serial communication interface comprises a transmission shift register and a transmission control circuit. The transmission shift register is configured to, when a transmission enable signal is asserted, generate the transmission signal by sequentially providing the content of the transmission shift register in response to the down-scaled clock signal. In various embodiments, the processing system is arranged to selectively transfer data from the microprocessor to the transmission shift register.

The transmission control circuit is configured to receive a start of transmission signal requesting the transmission of data, and in response to the start of transmission signal, assert the transmission enable signal. Moreover, when the transmission enable signal is asserted, the transmission control circuit increases a transmission count value in response to the down-scaled clock signal and determines whether the transmission count value reaches the requested number of bits stored to the control register. Accordingly, in response to determining that the transmission count value reaches the requested number of bits, the transmission control circuit may de-assert the transmission enable signal. Optionally, the transmission control circuit may also signal the completion of the data transmission to the microprocessor.

Accordingly, in various embodiments, the serial communication interface uses the same transmission shift register for both the CAN FD Light mode and the UART mode, whereby the transmission characteristics are set via the clock scaling factor and the requested number of bits. For example, in the CAN FD Light mode the requested number of bits may correspond to the length of the CAN FD Light frame, while in the UART mode the requested number of bits may be set implicitly by just activating the UART mode.

Accordingly, in various embodiments, the microprocessor may be configured to generate a transmission CAN FD Light frame, determine the length of the transmission CAN FD Light frame, program the control register in order to set the requested number of bits to the length of the transmission CAN FD Light frame, and the mode of operation to the CAN FD Light mode of operation, and provide the transmission CAN FD Light frame to the transmission shift register.

For example, in various embodiments, the transmission shift register may have at least 675 bits and the microprocessor may write the complete transmission CAN FD Light frame to the transmission shift register via the communication system.

Alternatively, the transmission shift register may have a given word size and the processing system may comprise a first DMA channel. In this case, the microprocessor may be configured to store the transmission CAN FD Light frame to the memory, and the first DMA channel may transfer packets of the given word size from the memory to the transmission shift register, thereby sequentially transferring the transmission CAN FD Light frame from the memory to the transmission shift register.

Conversely, in various embodiments, in order to implement the serial data reception, the serial communication interface comprises a reception shift register and a reception control circuit. Generally, the transmission shift register and the reception shift register may be implemented also with the same shift register.

In various embodiments, the reception shift register is configured to, when a reception enable signal is asserted, sequentially add the logic level of the reception signal to the content of the reception shift register in response to the down-scaled clock signal. In various embodiments, the processing system is arranged to selectively transfer data from the reception shift register to the microprocessor.

The reception control circuit is configured to detect a falling edge in the reception signal being indicative of the start of a new UART or CAN FD Light frame. Accordingly, in response to detecting a falling edge in the reception signal, the reception control circuit asserts the reception enable signal. However, the end-of-frame condition changes between UART and CAN FD Light. Accordingly, the reception control circuit is configured to determine whether the data stored to the control register indicate the CAN FD Light mode of operation or the UART mode of operation.

Specifically, when the reception enable signal is asserted and in response to determining that the data stored to the control register indicate the CAN FD Light mode, the reception control circuit may be configured to increase a first reception count value in response to the down-scaled clock signal and the reception signal is set to high. Conversely, the reception control circuit may be configured to reset the reception count value each time the reception signal is set to low. Moreover, the reception control circuit may be configured to determine whether the reception count value reaches eight, which indicates the end of the CAN FD Light frame. Accordingly, in response to determining that the reception count value reaches eight, the reception control circuit may de-assert the reception enable signal.

Conversely, when the reception enable signal is asserted and in response to determining that the data stored to the control register indicate the UART mode, the reception control circuit may increase a second reception count value in response to the down-scaled clock signal. Moreover, the reception control circuit may determine whether the reception count value reaches the requested number of bits as indicated by the control register, and in response to determining that the reception count value reaches the requested number of bits, the reception control circuit may de-assert the reception enable signal. Generally, the first reception count value and the second reception count value may be provided by the same counter.

Accordingly, in various embodiments, the reception control circuit is able to detect the end-of-frame condition of a variable length CAN FD Light frame or a fixed length UART frame.

Accordingly, in various embodiments, the microprocessor may be configured to program the control register in order to set the mode of operation to the CAN FD Light mode and determine whether the reception control circuit de-asserts the reception enable signal. In response to determining that the reception control circuit de-asserts the reception enable signal, the microprocessor may then obtain a reception CAN FD Light frame from the reception shift register, and analyze the content of the reception CAN FD Light frame.

For example, in various embodiments, the reception shift register has at least 675 bits and the microprocessor may be configured to read the complete reception CAN FD Light frame from the reception shift register via the communication system.

Alternatively, the reception shift register may have a given word size and the processing system may comprise a second DMA channel, wherein the second DMA channel is configured to transfer packets of the given word size from the reception shift register to the memory, thereby sequentially transferring a reception CAN FD Light frame from the reception shift register to the memory. In this case, the microprocessor may read the reception CAN FD Light frame from the memory.

In various embodiments, the data reception operation is synchronized with the reception signal. For this purpose, the clock management circuit may be configured to synchronize the generation of the down-scaled clock signal with a synchronization signal, and the reception control circuit may be configured to generate the synchronization signal in response to rising and/or falling edges in the reception signal.

Accordingly, the processing system may implement both a CAN FD Light controller/master or a CAN FD Light slave. Specifically, a CAN FD Light controller/master first transmits a transmission CAN FD Light frame and then optionally receives a reception CAN FD Light frame. Conversely, a CAN FD Light slave first receives a reception CAN FD Light frame and then optionally transmits a transmission CAN FD Light frame.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
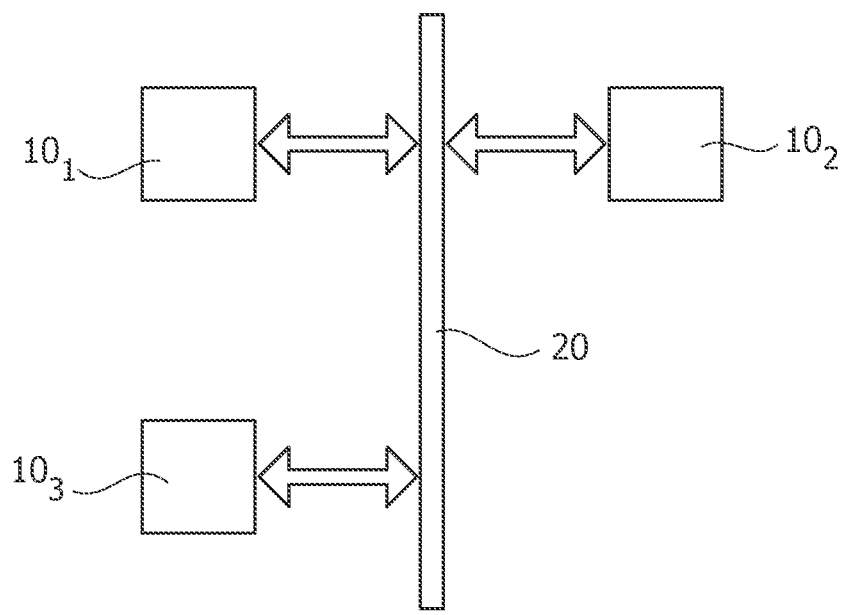
FIG. 1 shows an example of an electronic system comprising a plurality of processing systems.
Figure 2:
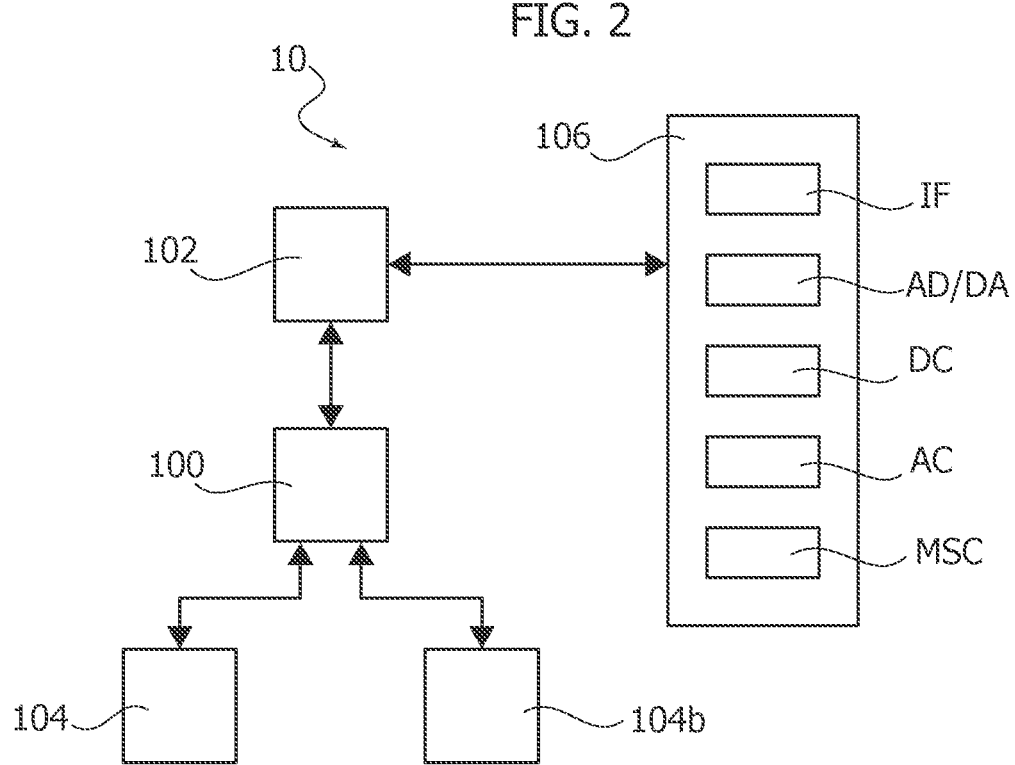
FIG. 2 shows an example of a processing system.
Figure 3:
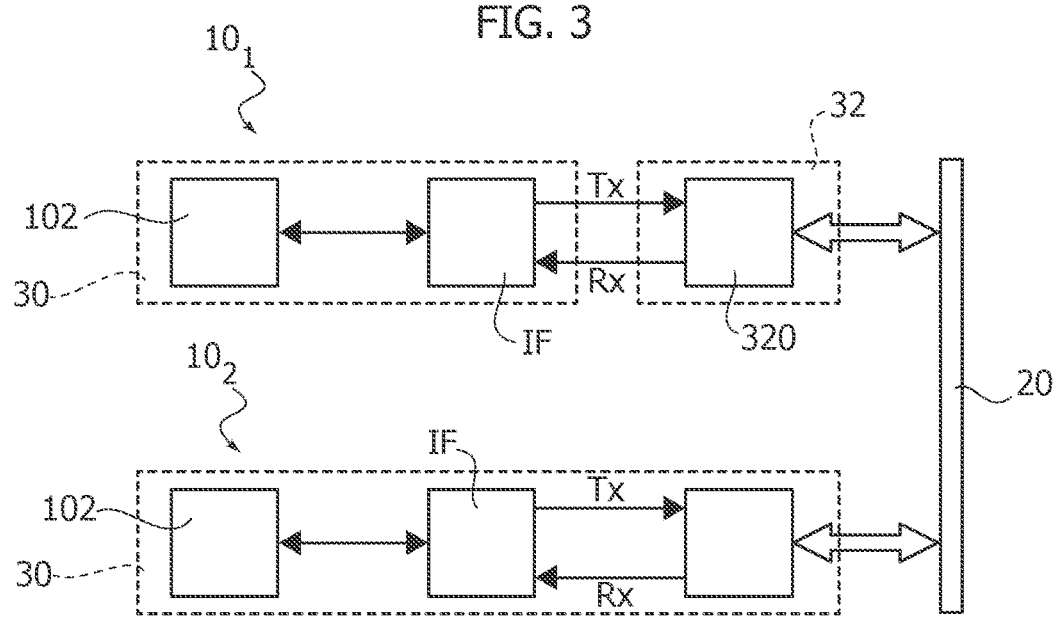
FIG. 3 shows an example of a CAN FD Light communication system.

In the following FIGS. 4 to 14 parts, elements or components which have already been described with reference to FIGS. 1 to 3 are denoted by the same references previously used in such Figure; the description of such previously described elements will not be repeated in the following in order not to overburden the present detailed description.

Figure 4:
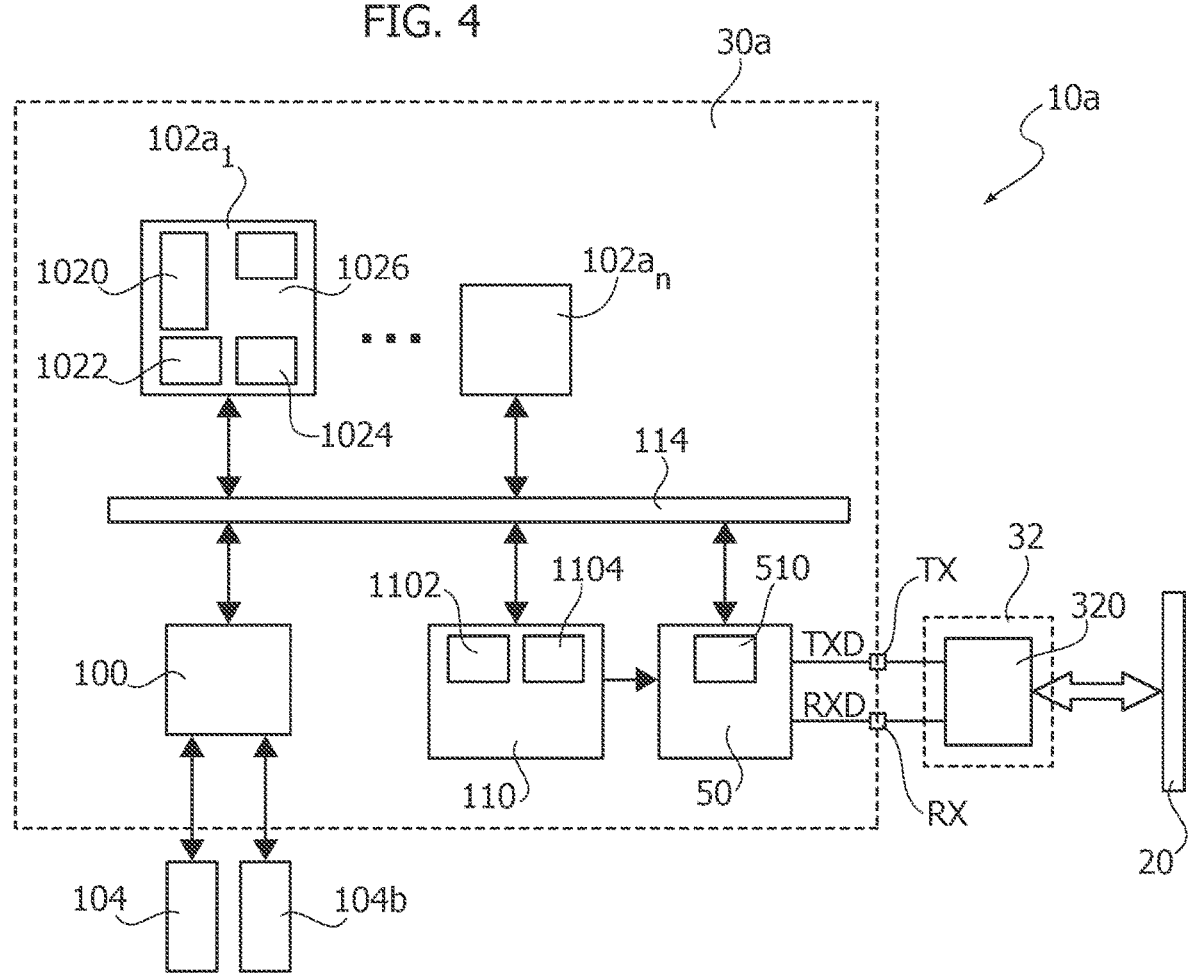
FIG. 4 shows an embodiment of a processing system configured to exchange data via a CAN FD Light bus.

FIG. 4 shows an embodiment of a processing system 10a in accordance with the present description.

Specifically, in the embodiment considered, the processing system 10a comprises at least one processing core 102a, such as n processing cores $102a_1 \ldots 102a_n$, connected to a (on-chip) communication system 114. For example, in the context of real-time control systems, the processing cores $102a_1 \ldots 102a_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core 102a1, each processing core 102a may comprise a microprocessor 1020 and a communication interface 1022 configured to manage the communication between the microprocessor 1020 and the communication system 114. In the embodiment considered, the interface 1022 is a master interface configured to forward a (read or write) request from the microprocessor 1020 to the communication system 114, and forward an optional response from the communication system 114 to the microprocessor 1020. In various embodiments, the processing core 102a may also comprise a slave interface 1024. For example, in this way, a first microprocessor 1020 may send a request to a second microprocessor 1020 (via the communication interface 1022 of the first microprocessor, the communication system 114 and the communication interface 1024 of the second microprocessor). For example, for this purpose the communication system 114 may comprise in addition to a system bus or NoC, also an additional co-processor bus, e.g., connecting the microprocessors 1020 of the same processing core 102a or all processing cores 102a.

In various embodiments, each processing core $102a_1 \ldots 102a_n$ may also comprise further local resources, such as one or more local memories 1026, usually identified as Tightly Coupled Memory (TCM).

As mentioned before, typically the processing cores $102a_1 \ldots 102a_n$ are arranged to exchange data with a non-volatile memory 104 and/or a volatile memory 104b. In various embodiments, these memories are system memories, i.e., shared for the processing cores $102a_1 \ldots 102a_n$. For example, in various embodiments, the processing system 10a comprises one or more memory controllers 100 configured to connect at least one non-volatile memory 104 and at least one volatile memory 104b to the communication system 114. As mentioned before, one or more of the memories 104 and/or 104b may be integrated in an integrated circuit 30a comprising the processing core(s) 102a or may be connected externally to the integrated circuit 30a. For example, the processing system 10a may comprise: a first volatile memory 104b integrated in the integrated circuit 30a of the processing system 10a and connected to the communication system 114 via a first memory controller 100, and a second volatile memory 104b external with respect to the integrated circuit 30a of the processing system 10a and connected to the communication system 114 via a second memory controller 100.

As mentioned before, the processing system 10a may comprise one or more resources 106, such as one or more communication interfaces or co-processors (e.g., a cryptographic co-processor).

Specifically, in the embodiment considered, the processing system 10a comprises a communication interface 50 connected to the communication system 114 via a slave communication interface 510.

Figure 5:
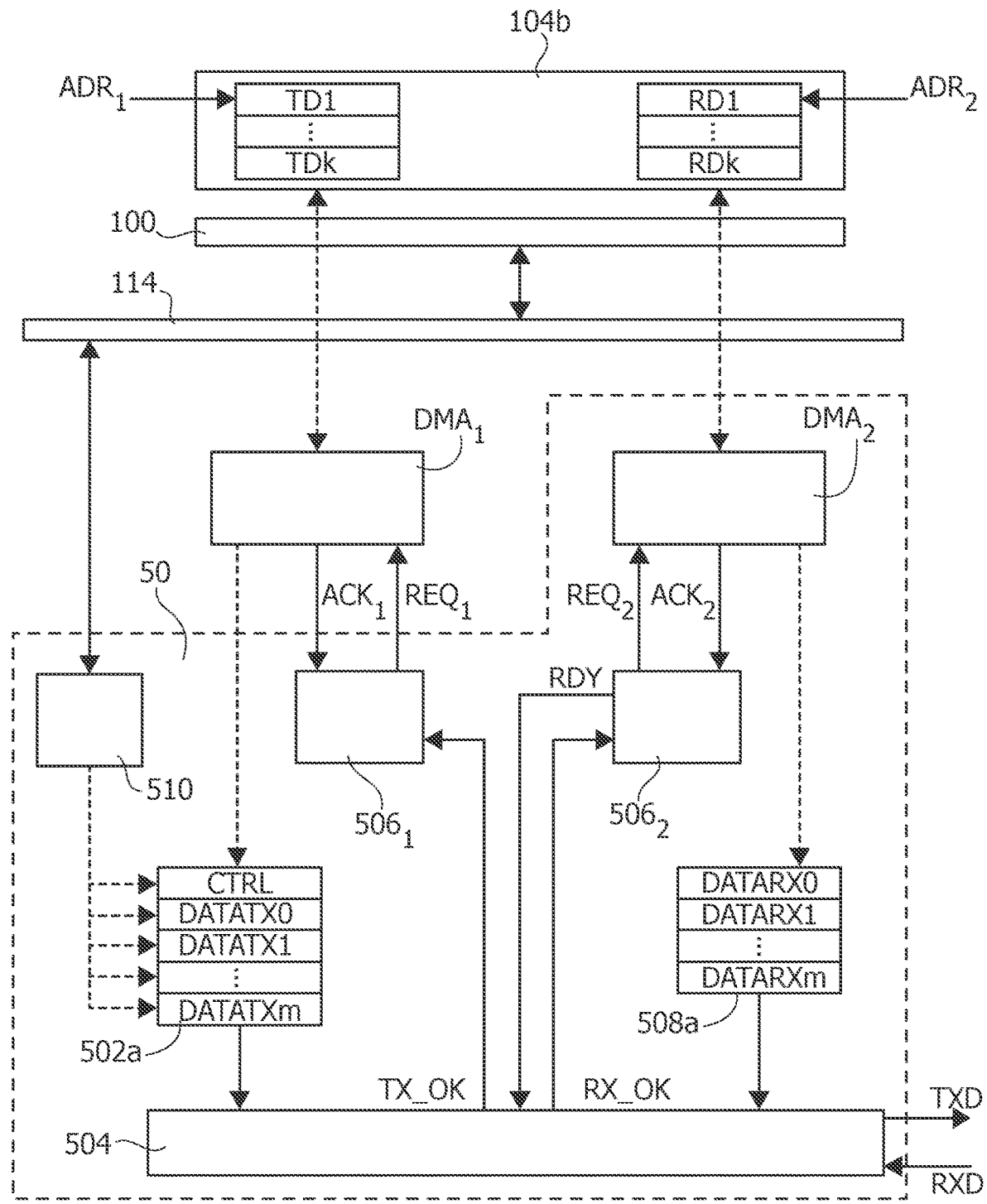
FIG. 5 shows an embodiment of a serial communication interface of the processing system of FIG. 4.

Specifically, as shown in FIG. 5, in various embodiments, the communication interface 50 comprises: a hardware transmission and reception interface circuit 504 configured to transmit data and receive data; one or more transmission data registers DATATX for storing data to be transmitted, such as m registers DATATX1 . . . DATATXm; one or more control registers CTRL for storing control data; and one or more reception data registers DATARX for storing data having been received, such as m registers DATARX1 . . . DATARXm.

In various embodiments, the same registers may be used as transmission data registers DATATX and reception data registers DATARX.

Accordingly, a processing core 102a may be configured to send one or more of the following requests via the communication system 114 to the slave interface 510 of the communication interface 50: a write request in order to write data to the transmission data register(s) DATATX; a write request in order to write data to the control register(s) CTRL, e.g., in order to configure the communication interface 50 and/or to start the data transmission operation; and a read request in order to read data from the reception data register(s) DATARX.

For example, in various embodiments, a processing core 102a may write a given number k of data packets TD1 . . . TDk to the m transmission data registers DATATX, or read a given number k of data packets RD1 . . . RDk from the m reception data registers DATARX. Generally, the number k of data packets may correspond to or be smaller than the number m of registers.

For example, for this purpose, each of the registers DATATX, DATARX and CTRL may have associated a respective physical address (PA) of the communication system 114, and each read or write request may comprise a given target address. For example, as mentioned before, the communication system 114 may comprise an Advanced Microcontroller Bus Architecture (AMBA) High-performance Bus (AHB), and an Advanced Peripheral Bus (APB) used to connect the communication interface 50 to the AMBA AHB bus.

In various embodiments, the processing system 10a comprises also one or more Direct-Memory-Access (DMA) controllers 110. Specifically, a DMA controller 110 comprises at least one functional channel connected to a resource 106. For example, as shown in FIG. 5, in this way, the communication interface 50 may be connected to the DMA controller 110 via two channels: a first channel $DMA_1$ configured to autonomously transfer data from a source address (e.g., associated with a first memory range in the memory 104b) to a target address associated with the transmission data registers DATATX; and a second channel $DMA_2$ configured to transfer data from a source address associated with the reception data registers DATARX to a target address (e.g., associated with a second memory range in the memory 104b).

For example, in various embodiments, the communication interface 50 comprises two DMA interface circuits $506_1$ and $506_2$. Specifically, the first DMA interface circuit $506_1$ is connected to the DMA channel $DMA_1$ and generates a first request signal $REQ_1$ used to request new data to be transmitted. Conversely, the second DMA interface circuit $506_2$ is connected to the DMA channel $DMA_2$ and generates a second request signal $REQ_2$ used to request the reading of the received data.

Generally, the DMA channel $DMA_1$ and/or the DMA channel $DMA_2$ may be implemented with a general-purpose DMA controller, or via an integrated DMA controller, which may be configured to send read or write requests, respectively, either to the communication system 114 or directly the memory controller 110. For example, as schematically shown in FIG. 5, in various embodiments, the DMA channel $DMA_1$ is implemented with a general-purpose DMA channel, which thus transfers data to the registers DATATX via the slave interface 510, while the DMA channel $DMA_2$ is an integrated DMA write channel implemented in the communication interface 50, which thus transfers data directly from the registers DATARX either to the communication system 114 or directly to the memory controller 100.

For example, in various embodiments, a data transmission may be started by writing the content of the control register(s) CTRL, e.g., in order to set a flag enabling the data transmission and/or a flag enabling DMA transfer. Accordingly, in response to the content of the control register(s) CTRL, the DMA interface circuit $506_1$ may assert the request signal $REQ_1$, whereby the DMA channel $DMA_1$ transfers a given number k of data packets TD1 ... TDk from the memory 104b to the m transmission data registers DATATX. For example, the source address of the DMA channel $DMA_1$ may be initialized to the address $ADR_1$ of the first memory slot TD1 used to store the transmission data and may be increased for each DMA data transfer. Conversely, the target address may be initialized to the address associated with the first transmission data register DATATX0 and the target address may be increased for each DMA data transfer.

In various embodiments, once having transferred the data packets TD1 ... TDk to the transmission data registers DATATX, the DMA channel $DMA_1$ may also assert an acknowledge signal $ACK_1$ indicating that the requested number k of packets TD1 ... TDk has been transferred to the transmission data registers DATATX. For example, the DMA interface circuit $506_1$ may de-assert the request signal $REQ_1$ in response to the acknowledge signal $ACK_1$. Moreover, the hardware communication interface 504 may start the data transmission in response to the acknowledge signal $ACK_1$.

In various embodiments, once having completed the transmission of a requested number of bits via a transmission signal TXD, the hardware communication interface 504 may assert a signal TX_OK. For example, in response to the signal TX_OK, the DMA interface circuit $506_1$ may assert again the request signal $REQ_1$, thereby requesting new data.

Additionally or alternatively, the signal TX_OK may be used to generate an interrupt for a processing core 102a.

Similarly, once having received a given number of bits via a reception signal RXD, the hardware communication interface 504 may assert a signal RX_OK. For example, in this case, the DMA interface circuit $506_2$ may be configured to assert the request signal $REQ_2$, and the DMA channel $DMA_2$ may be configured to transfer k packets from the m reception data registers DATARX to the memory 104b, thereby sequentially storing the received data RD1 ... RDn to the memory 104b. For example, the source address of the DMA channel $DMA_2$ may be initialized to the address associated with the first reception data register DATARX0 and the source address is increased for each data transfer. Conversely, the target address may be initialized to the address $ADR_2$ of the first memory slot RD1 used to store the received data and may be increased for each data transfer.

In various embodiments, once having transferred the data packets RD1 ... RDk to the memory 104b, the DMA channel $DMA_2$ may also assert an acknowledge signal $ACK_2$ indicating that the requested number k of packets RD1 ... RDk has been transferred to the memory 104b. For example, the DMA interface circuit $506_2$ may de-assert the request signal $REQ_2$ in response to the acknowledge signal $ACK_2$. In response to this acknowledge signal $ACK_2$, the DMA interface circuit $506_2$ may assert a ready signal RDY, which is provided to the hardware communication interface 504. Specifically, in this case, the hardware communication interface 504 may be configured to only accept new data when the signal RDY is asserted. Additionally or alternatively, the acknowledge signal $ACK_2$ may be used to generate an interrupt for a processing core 102a.

As shown in FIG. 4, in various embodiments, the DMA controller 110 may thus comprise: a slave interface 1104 for receiving from the communication system 114 configuration data for configuring the channels of the DMA controller 110, such as the initial source address, the initial target address and the number k of DMA transfers to be executed; and a master interface 1102 for transmitting the read and/or write requests via the communication system 114 (or directly) to the memory controller 100.

Specifically, in various embodiments, the communication interface 50 is a serial communication interface configured to: generate an NRZ encoded transmission signal TXD, such as a binary bit sequency, as a function of the data stored to the transmission data register(s) DATATX, and sample an NRZ encoded reception signal RXD, such as a binary bit sequency, and store the respective data to the reception data register(s) DATARX.

Specifically, as shown in FIG. 4, in various embodiments, the transmission signal TXD and the reception signal RXD may be connected to a transmission terminal TX and a reception terminal RX, respectively. In various embodiments, the transmission terminal TX and the reception terminal RX are connected to a CAN FD transceiver 320 in order to exchange data via a CAN FD Light bus 20.

Generally, the transmission terminal TX and the reception terminal RX may be pads of the die of the integrated circuit 30a or pins of a packaged integrated circuit 30a, wherein the CAN FD transceiver 320 is provided in a separate integrated circuit 32. Alternatively, the CAN FD transceiver 320 may be integrated in the integrated circuit 30a.

Figure 6:
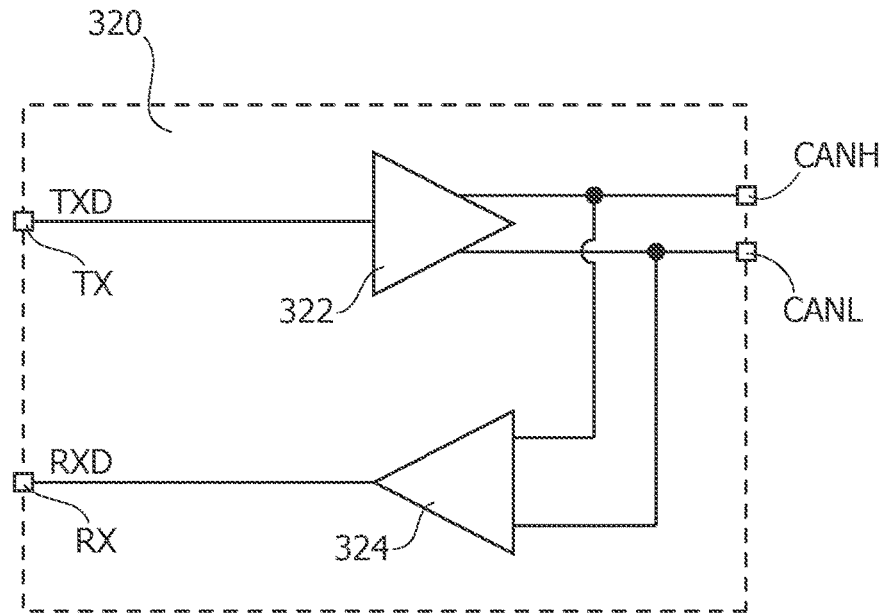
FIG. 6 shows an embodiment of a CAN FD transceiver adapted to be used in the processing system of FIG. 4.

For example, FIG. 6 shows a possible embodiment of a CAN FD transceiver 320.

Specifically, according to the CAN FD standard, the transceiver 320 is configure to receive an NRZ (e.g., NRZ-L) encoded transmission signal TXD, such as a binary bit sequence. In the embodiment considered, the transceiver 320 comprises thus a CAN FD transmitter circuit 322, wherein the transmitter circuit 322 is connected to pins/pads CANH and CANL to be connected to the differential data wires of the CAN FD (Light) bus 20.

The transceiver 320 comprises also a CAN FD receiver circuit 324 configured to generate a signal RXD by analyzing the voltage between the terminals CANH and CANL. Specifically, according to the CAN FD standard, the signal RXD is an NRZ encoded signal, such as a binary encoded signal.

Accordingly, a CAN transceiver 320 essentially converts the voltage levels of the signals, while the CAN FD Light protocol management and the respective timing of the signals has to be implemented in the CAN FD Light controller implemented in the processing system 10*a*. Accordingly, in various embodiments, the processing system 10*a* should be able to generate the transmission signal TXD according to the CAN FD Light protocol, and similarly reconstruct a transmitted bit sequence based on the logic level of the received signal RXD.

Thus, before explaining the implementation of the CAN controller with the processing system 10*a*, it is worth to briefly explain the CAN FD Light protocol. Specifically, CAN FD Light is a commander/responder protocol based on the CAN FD protocol. This is described in the reference documents cited previously. Generally, concerning the CAN FD protocol, reference can be made also to documents "*Road vehicles—Controller area network (CAN)—Part 1: Data link layer and physical signaling*", ISO 11898-1:2015 2015, "*Road vehicles—Controller area network (CAN)—Part 2: High-speed medium access unit*", ISO 11898-2:2016 2016, and/or "*RM0407 Reference manual—SPC584Cx/SPC58ECx 32-bit MCU family built on the Power Architecture for automotive body electronics applications*", RM0407 Rev. 5, May/2019.

Thus, with respect to CAN FD protocol, essentially the CAN FD Light protocol omits the arbitration phase. Accordingly, the commander controls the entire communication and initiates each communication cycle by either sending a frame without expecting an answer from the other network participants ("responders"), such as broadcast frames, or by sending a frame to a dedicated addressed responder while expecting an answer from this responder. i.e., unicast frames in a request and answer scheme. The request frames can also be used to send data to the addressed responder. Only the addressed responder from which an answer is requested is expected to send a frame back, i.e., no other device on the bus is expected to send data at the same time. Accordingly, the sequence of frames on the bus 20 is precisely defined and no arbitration is required. For example, with this scheme, error frames are not required, because the communication direction and the answers are clearly identified. Similarly, also an acknowledge neither from the commander nor from the responders is required. Erroneous frames are dropped and are regarded in the CAN FD Light scheme as not having been received.

Figure 7A:
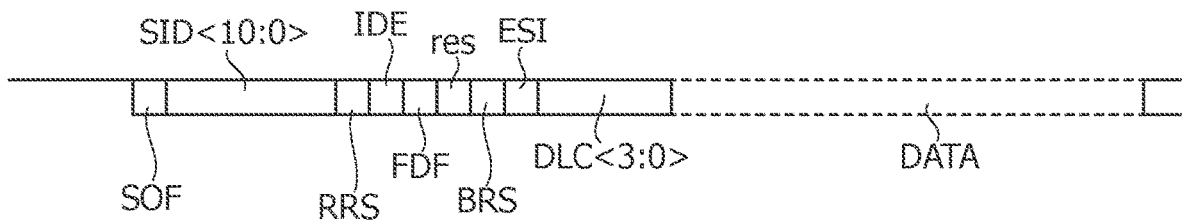
FIGS. 7A and 7B show an example of a CAN FD Light frame.
Figure 7B:
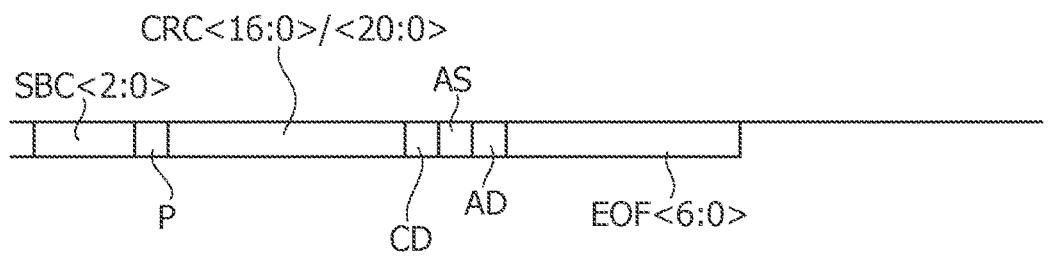

For example, FIGS. 7A and 7B show a typical CAN FD Light frame.

Specifically, the CAN FD Light protocol uses a dominant logic level, which usually corresponds to the low logic level ("0"), and a recessive logic level, which usually corresponds to the high logic level ("1"). The implementation of the logic level of the dominant and recessive logic level depends on the implementation of the CAN FD transceiver 320.

In the embodiments shown in FIGS. 7A and 7B, a CAN FD Light frame comprises, as specified in ISO 11898-1: 2015, in sequence:
- a start-of-frame bit SOF;
- an 11-bit CAN standard identifier SID<10:0>;
- a Remote Request Substitution bit RRS set to the dominant level (e.g., "0");
- an Identifier Extension bit IDE set to the dominant level (e.g., "0");
- a Flexible Data Format bit FDS set to the recessive level (e.g., "1");
- a reserved bit res usually set to the dominant level (e.g., "0");
- a Bit Rate Switch bit BRS set to the dominant level (e.g., "0"), which indicates that the payload is transmitted with the same rate;
- an Error Status Indicator bit ESI set to the dominant level (e.g., "0");
- a 4-bit Data Length Code field DLC <3:0>, which permits to specify the amount of data to be transmitted (values 0x0000 to 0x1000 correspond to 0-8 data bytes, and values 0x1001 to 0x1111 correspond to 12, 16, 20, 24, 32, 48 and 64 data bytes, respectively);
- the payload DATA, which may correspond to 0-8, 12, 16, 20, 24, 32, 48 and 64 data bytes (see the field DLC);
- a 3-bit Stuff Bit Counter field SBC<2:0>;
- an even parity bit P;
- a Cyclic Redundancy Check field CRC having 17 bits (for up to 16 data bytes) or 21 bits (for 20 to 64 data bytes);
- a CRC Delimiter bit CD set to the recessive level (e.g., "1");
- an Acknowledge bit AS;
- an Acknowledge Delimiter bit AD set to the recessive level (e.g., "1"); and
- a 7-bit End-of-Frame field EOF<6:0> having all bits set to the recessive level (e.g., "1").

The inventors have observed that in a CAN FD Light system, the CAN controller may thus prepare the complete frame prior to transmission and then send the bit-sequence of the frame without running an arbitration.

For example, in the embodiment shown in FIGS. 4 and 5, a processing core 102*a* may prepare the complete CAN FD Light frame represented by the transmission data TD1 . . . TDk, and then either: write the transmission frame/data TD1 . . . TDk to the transmission data registers DATATX, or write the transmission frame/data TD1 . . . TDk to memory 104*a*, and then activate the DMA transfer, whereby the DMA channel DMA1 transfers the transmission frame TD1 . . . TDk from the memory 104*b* to the transmission data registers DATATX.

Figure 13:
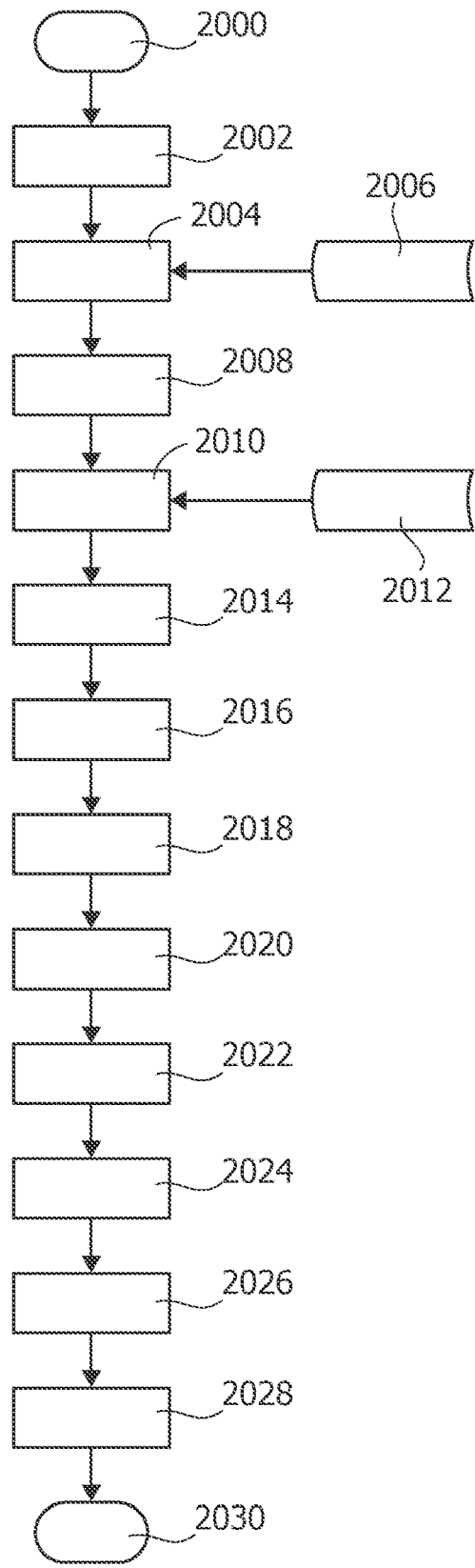
FIG. 13 shows an embodiment of the operation of a microprocessor of the processing system of FIG. 4 in order to transmit data.

FIG. 13 shows in this respect an embodiment of the operation, e.g., implemented via software instructions, of the processing core 102*a* in order to transmit data.

Specifically, at a start step 2000, the processing core 102*a* decides to transmit given data via the communication interface 50/the CAN FD Light bus 20, thus starting the generation of the transmission frame/data TD1 . . . TDk.

At a step 2002, the processing core 102*a* sets at a step 2004 the start-of-frame bit SOF to the dominant level. As will be described later on, this step is purely optional.

Next, the processing core 102*a* obtains a standard identifier at a step 2006 and adds at a step 2004 the respective standard identifier to the field SID of the transmission frame TD1 . . . TDk.

Next, the processing core 102*a* adds at a step 2008 predefined CAN FD Light control bits to the transmission frame TD1 ... TDk. The control bits include the bits RRS, IDE, FDF, BRS, and ESI, which may have fixed levels for a CAN FD Light frame.

Next, the processing core 102a obtains at a step 2012 the data to be transmitted, determines at a step 2010 the corresponding data length code (DLC) and adds at a step 2014 the data length code to the field DLC and the data to be transmitted to the field DATA of the transmission frame TD1 ... TDk.

At a step 2016, the processing core 102a adds then possible stuff bits according to the bit stuff rule of the CAN FD Light standard ISO 11898-1:2015, and calculates at a step 2018 the respective stuff bit count and adds the stuff bit count to the field SBC of the transmission frame TD1 ... TDk. Similarly, the processing core 102a may determine the value of the parity bit and add the parity bit to the field P of the transmission frame TD1 ... TDk.

At a step 2020, the processing core 102a determines then the respective number of CRC bits and adds the CRC bits to the field CRC of the transmission frame TD1 ... TDk. Generally, fixed stuff bits according to ISO 11898-1:2015 may also be added in this step.

Finally, the processing core 102a adds at a step 2022 the trailing bits for the acknowledge fields AS and AD, and the end-of-frame delimiter EOF.

Accordingly, based on the content of the transmission frame, or only the length of the variable length fields, the processing core 102a may determine at a step 2024 the frame length and store data identifying the frame length to the control register CTRL of the communication interface 50.

Moreover, the processing core 102a may store at a step 2026 the transmission frame/data TD1 ... TDk to the transmission data registers DATATX, or to the memory 104b and activate the DMA transfer of the DMA channel $DMA_1$.

Finally, the processing core 102a may activate at a step 2028 the data transmission operation, e.g., by setting a respective bit in the control register CTRL, and the procedure terminates at a step 2030.

Generally, the programming operations of the control register CTRL at the steps 2024, 2026 and 2028 may also be combined by performing only a single programming of the control register CTRL.

Generally, in order to determine that the transmission of the transmission frame/data TD1 ... TDk has been completed, the processing core 102a may monitor a flag in the control register CTRL and/or receive an interrupt from the communication interface 50 (e.g., both set in response to the signal TX_OK).

Figure 14:
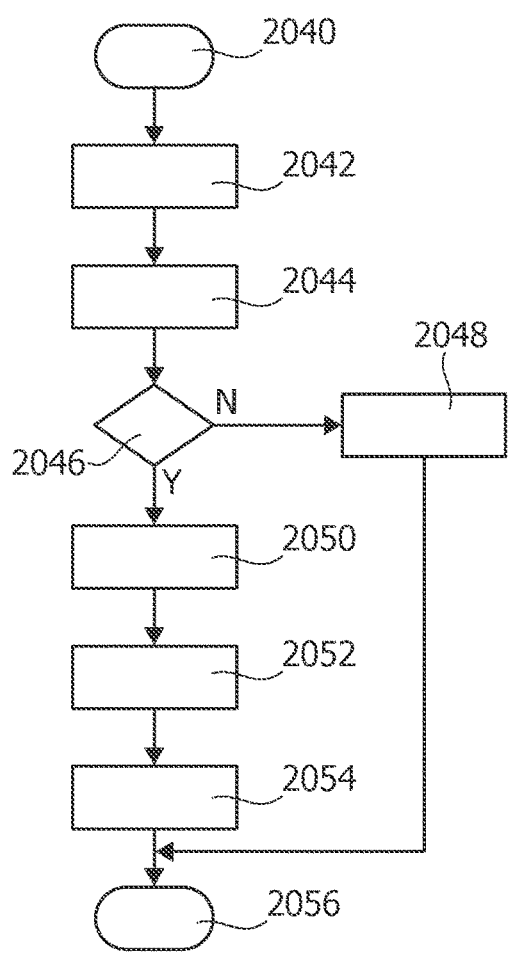
FIG. 14 shows an embodiment of the operation of a microprocessor of the processing system of FIG. 4 in order to received data.

FIG. 14 shows in this respect an embodiment of the operation, e.g., implemented via software instructions, of the processing core 102a in order to receive data.

Specifically, once a new frame RD1 ... RDk has been received by the communication interface 50 at a start step 2040, the processing core 102a may read at a step 2042 the received frame/data RD1 ... RDk. For example, in order to start the procedure, the processing core 102a may monitor a flag in the control register CTRL and/or receive an interrupt from the communication interface 50. In this respect, the flag and/or interrupt may be asserted when the communication interface 50 stores the data to the reception data registers DATARX (e.g., as indicated by the signal RX_OK) and/or once having transferred the data RD1 ... RDk to the memory 104b via the DMA channel $DMA_2$ (e.g., as indicated by the signal $ACK_2$). Accordingly, at the step 2042, the processing core 102a may read the received frame/data RD1 ... RDk form the reception data registers DATARX or the memory 104b. Accordingly, in various embodiments, prior to receiving data, the processing core 102a may activate the DMA transfer of the DMA channel $DMA_2$, whereby the DMA channel $DMA_2$ transfers the received frame from the reception data registers DATARX to the memory 104b.

At a step 2044, the processing core 102a may then calculate the CRC data for the received frame/data RD1 ... RDk, and may compare at a step 2046 the received CRC data (field CRC, e.g., after removal of the fixed stuff bits according ISO 11898-1:2015) with the calculated CRC data.

In case the received CRC data do not correspond to the calculated CRC data (output "N" of the verification step 2046), the processing core 102a may disregard/drop the received data at a step 2048, and the procedure terminates at a stop step 2056.

Conversely, in case the received CRC data do correspond to the calculated CRC data (output "Y" of the verification step 2046), the processing core 102a removes at a step 2050 possible stuff bits.

At a step 2052, the processing core 102a may then obtain the standard identifier SID.

Finally, at a step 2054, the processing core 102a may extract the data from the received frame/data RD1 ... RDk. Generally, in order to determine the length of the data field DATA (and thus the length of the CRC field), the processing core 102a may extract the data length code DLC and/or may determine the number of bits received. Accordingly, at the step 2054, the processing core 102a has obtained the identifier SID and the respective data, and the procedure terminates at the step 2056.

Accordingly, in this case, the transmission portion of the hardware serial communication interface 504 may be configured to transfer a given number of bits corresponding to the length of the transmission frame stored to the transmission data registers DATATX according to the timing of the CAN FD Light standard. Similarly, the reception portion of the hardware serial communication interface 504 should be configured to receive the reception frame according to the timing of the CAN FD Light standard and store the frame to the reception data registers DATARX. However, in this case, in order to determine the length of the reception frame, the reception portion should also be configured to detect the End-of-Frame field EOF<6:0> having all bits set to the recessive level (e.g., "1"). Specifically, in various embodiments, due to the fact that the Acknowledge Delimiter bit AD should be set to the recessive level, the reception portion is configured to determine the end of the frame by detecting eight consecutive bits being set to the recessive level.

Figure 8:
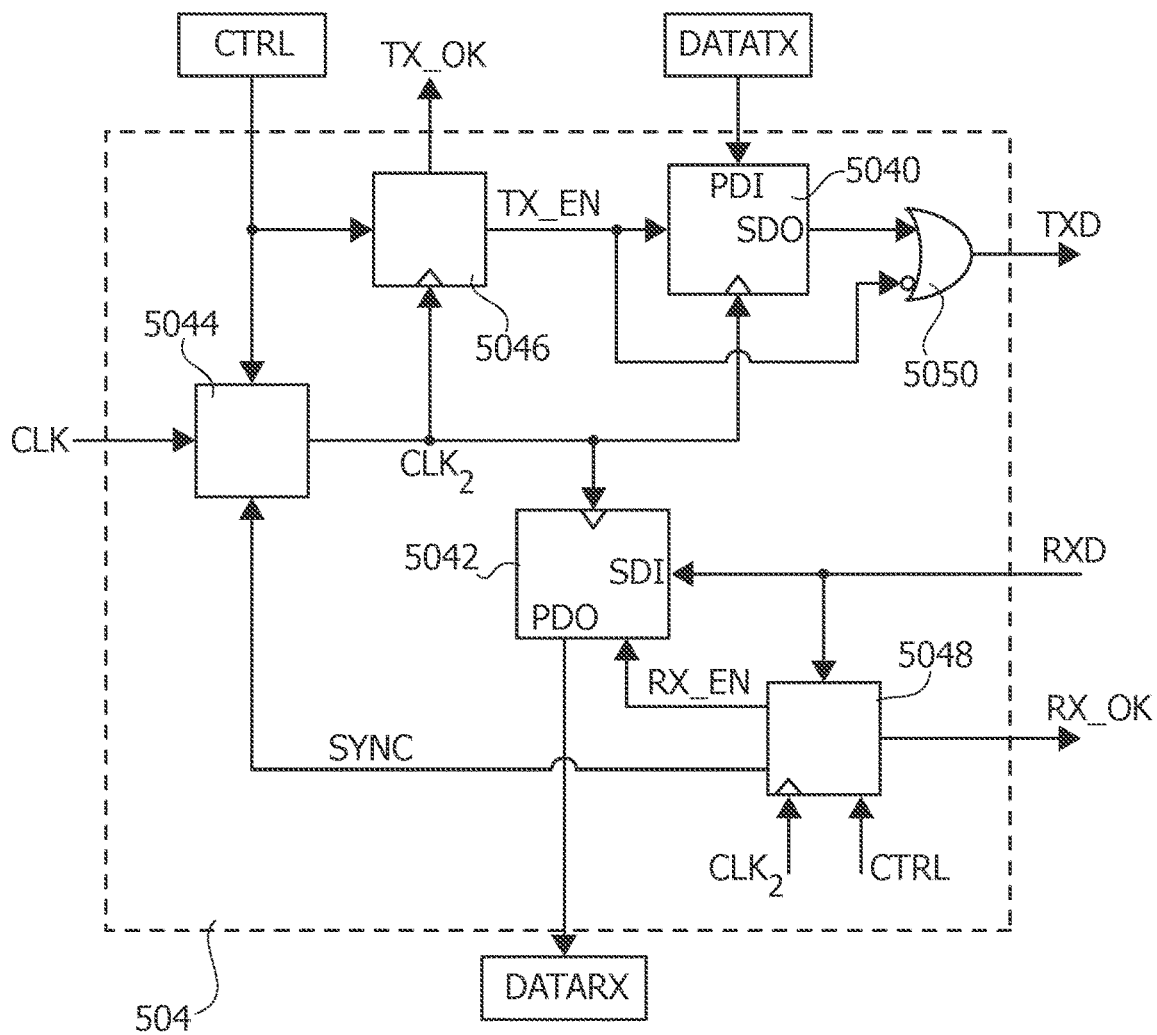
FIG. 8 shows an embodiment of a hardware transmission and reception circuit of the serial communication interface of FIG. 5.

FIG. 8 shows an embodiment of the hardware serial communication interface 504.

Specifically, in the embodiment considered, the hardware communication interface 504 comprises two shift registers 5040 and 5042. Specifically, in the embodiment considered, the shift register 5040 is used to store the data to be transmitted.

In this respect, the inventors have observed that a CAN FD Light frame as shown in FIGS. 7A and 7B includes a single start-of-frame bit SOF (set to the dominant level) and seven end-of-frame bits EOF (set to the recessive level). Moreover, a CAN FD Light frame may comprise up to 675 bits. Specifically, the CAN FD Light comprises a fixed number of 35 bits comprising 22 bits of control fields SOF, ID, RRS, IDE, FDF, res, BRS, ESI and DLC, 4 bits for the stuff bit counter field SBC and the parity bit P, 2 bits for the acknowledge fields AS and AD, and 7 bits for end-of-frame field EOF. In addition to these 35 fixed bits, a number of variable bits may be added, i.e., the data field DATA and the field CRC. The length of the data field DATA is indicated by the content of the data length code DLC. The value DLC also determines the number of bits of the CRC field, i.e., either 17 or 21 bits. Moreover, depending on the content of the frame, additional stuff bits are added according to the bit stuffing rule described in ISO 11898-1. Accordingly, while the number of bits of a frame may be variable, the number of bits is known prior to starting the data transmission operation.

Accordingly, once the processing core 102a has generated the data of the transmission frame TD1 . . . TDk, the processing core 102a may also determine the number of bits to be transmitted. Specifically, in various embodiments, the processing core 102a is configured to write data to the control register CTRL, which identify the number of bits to be transmitted.

Accordingly, once a data transmission is requested, the hardware communication interface 504 may transfer the content of the transmission data registers DATATX to the shift register 5040, e.g., by using a parallel data input PDI of the shift register 5040. For this purpose, the transmission data register DATATX and the shift-register 5040 have preferably the same dimension and are configured to store at least 675 bits.

Generally, the transmission frame stored to the transmission data register DATATX may also not comprise the start-of-frame bit SOF. For example, in this case, a first bit of the shift-register 5040 may be set to "0", while the other bits of the shift-register 5040 are mapped to respective bits of the transmission data register DATATX.

Moreover, in various embodiments, the data register DATATX and the shift-register 5040 may be implemented with the same shift-register, which may be written, e.g., via the slave interface 510 and/or the DMA channel $DMA_1$. Also in this case, an additional bit may be used to store the start-of-frame bit SOF.

Thus, in general, the processing core 102a prepares a CAN FD Light frame (with or without the start-of-frame bit SOF), and the CAN FD Light frame is transferred (via the processing core 102a and/or the DMA channel $DMA_1$) to the shift register 5040, which optionally may add the start-of-frame bits SOF.

In various embodiments, the shift register 5040 is configured to sequentially transmit the bits stored to the shift register 5040 as a function of a clock signal $CLK_2$ and a transmission enable signal TX_EN.

Specifically, in the embodiment considered, the hardware communication interface 504 comprises also a clock management circuit 5044 configured to generate the clock signal $CLK_2$ for the hardware communication interface 504 in response to a system clock signal CLK of the processing system 10a.

Figure 9:
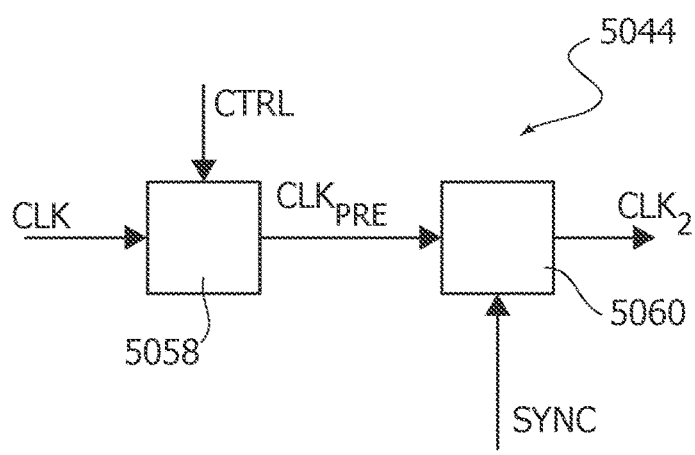
FIG. 9 shows an embodiment of a clock management circuit of the hardware transmission and reception circuit of FIG. 8.

For example, as shown in FIG. 9, in various embodiments, the clock management circuit may comprise a clock pre-scaling circuit 5058 configured to generate a pre-scaled clock signal $CLK_{PKE}$ having a reduced frequency with respect to the frequency of the clock signal CLK, wherein the scaling factor may be programmable as a function of the configuration data stored to the control register(s) CTRL. For example, the pre-scaling circuit 5058 may be implemented with a counter configured to increase a count value in response to the clock signal CLK, wherein the counter changes the logic level of the clock signal $CLK_{PKE}$ when the count value reaches a threshold value, wherein the threshold value is determined as a function of the configuration data provided by the control register(s) CTRL.

In the embodiment considered, the pre-scaled clock signal $CLK_{PKE}$ is then provided to a further down-scaling circuit 5060 configured to generate the clock signal $CLK_2$ having a reduce frequency with respect to the frequency of the clock signal $CLK_{PKE}$, wherein the scaling factor may be fixed or programmable as a function of the configuration data stored to the control register(s) CTRL. For example, the down-scaling circuit 5060 may be implemented with a counter configured to increase a count value in response to the clock signal $CLK_{PKE}$, wherein the counter changes the logic level of the clock signal $CLK_{PKE}$ when the count value reaches a threshold value, wherein the threshold value is optionally determined as a function of the configuration data provided by the configuration register(s) CTRL.

As shown in FIG. 9, in various embodiments, the operation of the down-scaling circuit 5060 is changed in response to a synchronization signal SYNC, which is however only used when receiving data and will be described later on.

Accordingly, when transmitting data, the clock signal CLK2 corresponds to a down-scaled version of the clock signal CLK (as a function of the configuration data stored to the control register CTRL), and may have, e.g., 1 MHz or another frequency supported by CAN FD Light.

As mentioned before, the shift register 5040 also receives an enable signal TX_EN, which enables the data transmission operation. Specifically, in the embodiment considered, the shift register 5040 is configured to, when the enable signal TX_EN is asserted and in response to the clock signal $CLK_2$, sequentially provide at a serial data output SDO the content of the shift-register 5040. Accordingly, when the enable signal TX_EN is asserted, the shift register 5040 sequentially provides the bits of the data stored to the shift register 5040 (starting from the start-of-frame bit SOF).

In the embodiment considered, the enable signal TX_EN is generated by a transmission control circuit 5046 configured to determine whether a given number of requested bits has been transmitted. Accordingly, in various embodiments, the transmission control circuit 5046 is configured to determine the number of requests bits to be transmitted as a function of the configuration data stored to the control register(s) CTRL. For example, the configuration data stored to the control register(s) CTRL may correspond to the total number of bits to be transmitted (with or without the start-of-frame bit SOF).

For example, in various embodiments, the transmission control circuit 5046 may comprise a counter, which is increased in response to the clock signal $CLK_2$, thereby indicating the number of transmitted bits. Accordingly, the counter may be reset when starting a new data transmission operation, thereby asserting the enable signal TX_EN, and the transmission control circuit 5046 de-asserts the enable signal TX_EN when the requested number of bits has been transmitted. For example, in this case, transmission control circuit may assert the control signal TX_OK when the transmission control circuit 5046 de-asserts the enable signal TX_EN.

In various embodiments, the hardware communication interface 504 comprises a combinational logic circuit 5050 configured to set the signal TXD to the recessive level, e.g., high, when the enable signal TX_EN is de-asserted. For example, in case the enable signal TX_EN is set to low when the enable signal TX_EN is de-asserted, the combinational logic circuit 5050 may be implemented with a logic OR gate receiving at input the serial data output signal SDO of the shift register 5056 and the inverted version of the enable signal TX_EN, and providing at output the signal TXD.

The combinational logic circuit 5050 is purely optional, because the serial data output signal SDO may also be set to the recessive level, when the enable signal TX_EN is de-asserted, e.g., because the end-of-frame bits EOF are already set to the recessive level.

Conversely, the shift register 5042 is configured to store the bits received via the signal RXD.

Specifically, when no data transmission occurs, the reception signal RXD is set to the recessive level, e.g., high. Once a transmission is started by another device, the start-of-frame bits SOF is transmitted, whereby the reception signal RXD is set to the dominant level, e.g., low.

Accordingly, in various embodiments, the hardware communication interface 504 comprises a reception control circuit 5048. Specifically, the reception control circuit 5048 is configured to assert a reception enable signal RX_EN in response to a change of the signal RXD from the recessive level to the dominant level, e.g., in response to a falling edge of the signal RXD.

Generally, as mentioned before, the start-of-frame bit SOF may be followed by a variable number of bits (up to 675 bits). However, the end-of-frame condition is precisely determined by a sequence of 8 bits being set to the recessive level, e.g., high, which correspond to the bit AD and the end-of-frame field EOF. In fact, the bit stuffing of the CAN FD Light protocol guarantees a change of the logic level of the other data at most after a sequence of five bits having the same logic level.

Accordingly, in various embodiments, the reception control circuit 5048 is configured to de-assert a reception enable signal RX_EN in response to determining that eight consecutive bits are set to the recessive level. For example, for this purpose, the reception control circuit 5048 may comprise a counter configured to increase a count value in response to the clock signal $CLK_2$, wherein the counter is reset when the signal RXD is set to the dominant level. Accordingly, in this case, the reception control circuit 5048 may de-assert the reception enable signal RX_EN when the counter reaches 8.

Accordingly, in various embodiments, the shift register 5042 is configured to, when the enable signal RX_EN is asserted and in response to the clock signal $CLK_2$, sequentially add to the data stored to the shift register 5042 the logic level applied to a serial data input SDI of the shift register 5042, wherein the serial data input SDI is connected to the reception signal RXD. Generally, the reception control circuit 5048 may assert the reception enable signal RX_EN with the start-of-frame bit SOF or only for the next bit, whereby the start-of-frame bit SOF is stored or not stored to the shift register 5042.

Accordingly, once eight consecutive recessive bits have been received, the reception control circuit 5048 de-asserts the reception enable signal RX_EN. The reception control circuit 5048 may also assert the control signal RX_OK in this case.

Moreover, once the eight consecutive recessive bits have been received, e.g., in response to the signal RX_OK, the hardware communication interface 504 transfers the content of the shift register 5042 to the reception data register DATARX, e.g., by using a parallel data output PDO of the shift register 5042. For this purpose, the reception data register DATARX and the shift-register 5042 have preferably the same dimension and are configured to store at least 675 bits. As mentioned before, the reception frame transferred to the reception data register DATARX may also not comprise the start-of-frame bit SOF.

Moreover, in various embodiments, the data register DATARX and the shift-register 5042 may be implemented with the same shift-register, which may be read, e.g., via the slave interface 510 or the DMA channel $DMA_2$.

Figure 10:
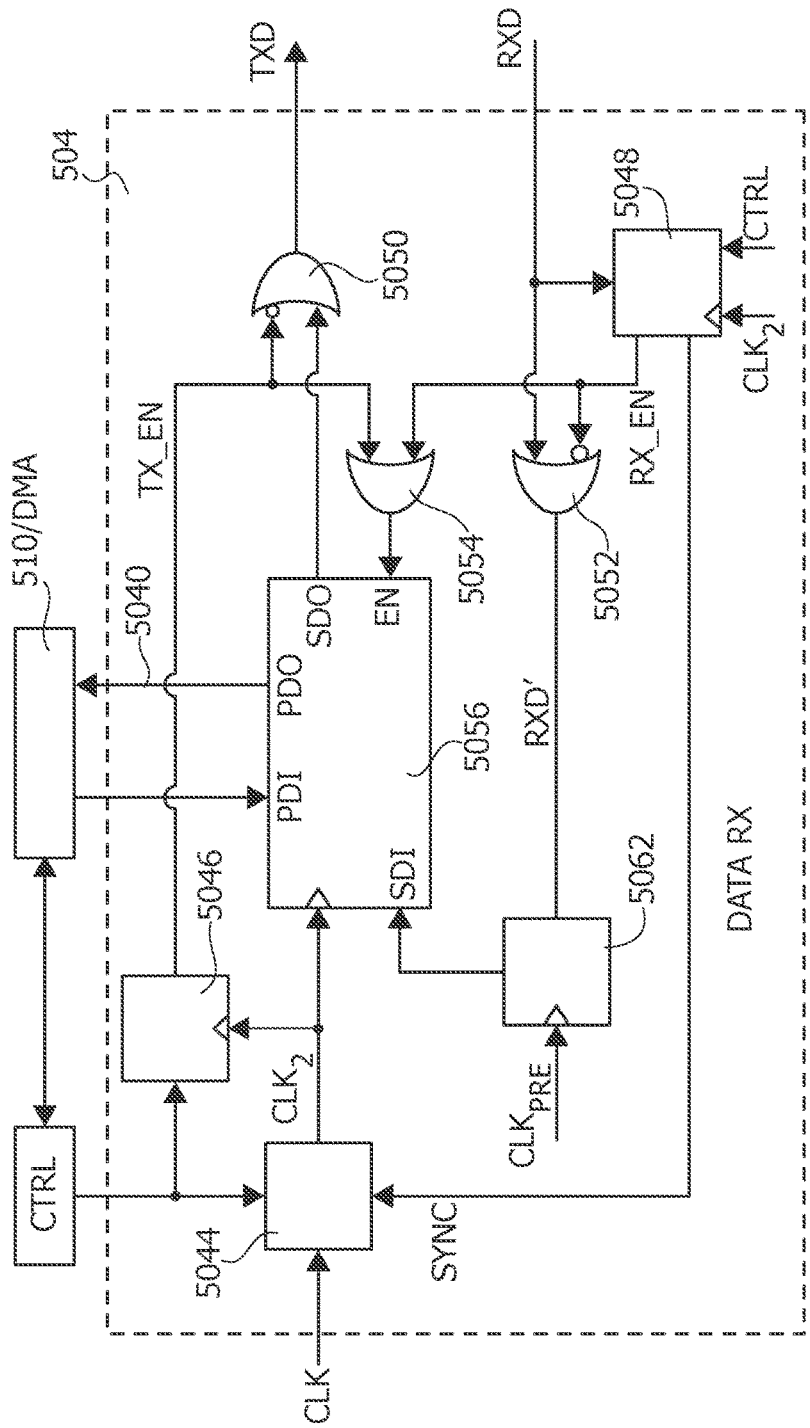
FIG. 10 shows an embodiment of the operation of the hardware transmission and reception circuit of FIG. 8.

FIG. 10 shows in this respect a modified hardware communication interface 504, which comprises only a single shift register 5056. Accordingly, in the following will only be evidenced the differences with respect to FIG. 8.

Specifically, in the embodiment considered, the shift register 5056 is configured to, when an enable signal EN is asserted, sequentially shift the content of the shift register 5056 in response to the clock signal $CLK_2$, wherein a first bit is provided via a serial data output SDO of the shift register 5056 and a second bit received via a serial data input SDI of the shift register 5056 is added to the content of the shift register 5056.

Accordingly, in this case, the serial data output SDO may be connected to the transmission signal TXD, or preferably to the logic gate 5050. Conversely, the serial data input SDI may be connected to the reception signal RXD. Preferably, also in this case is used an additional logic gate 5052, which sets a signal RXD' provided to the serial data input SDI to the recessive level, e.g., high, when the reception enable signal RX_EN is set to low. For example, in various embodiments, the logic gate 5052 is an OR gate receiving at input the reception signal RXD and the inverted version of the reception enable signal RX_EN.

Specifically, in the embodiment considered, the enable signal EN of the shift register 5056 is asserted when either the transmission enable signal TX_EN or the reception enable signal RX_EN is asserted. For example, for this purpose, the hardware communication interface 504 comprises a logic gate 5054, such as an OR gate, configured to generate the enable signal EN by combining the transmission enable signal TX_EN and the reception enable signal RX_EN.

Accordingly, also in this case, the transmission frame (with or without the start-of-frame bits SOF) may be transferred to the shift register 5056, either directly or indirectly via the transmission data register DATATX, e.g., by using a parallel data input PDI of the shift register 5056. Similarly, the reception frame (with or without the start-of-frame bits SOF) may be transferred from the shift register 5056, either directly or indirectly via the reception data register DATARX, e.g., by using a parallel data output PDO of the shift register 5056.

Figure 11:
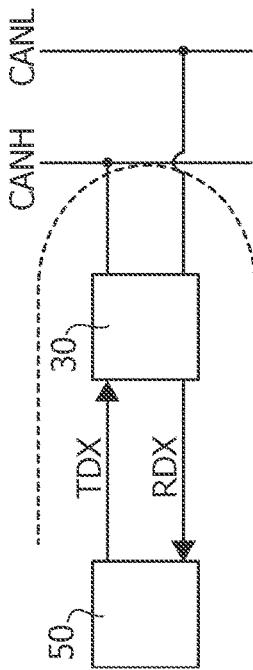
FIG. 11 shows a further embodiment of a hardware transmission and reception circuit of the serial communication interface of FIG. 5.

As shown in FIG. 11, when transmitting data via a CAN FD transceiver 320, indeed the reception signal RXD corresponds to a feedback of the transmission signal TXD.

Accordingly, this permits to implement an additional monitoring feature for the transmitted frame, i.e., the received frame may be compared with the transmitted frame. For example, this can be used as a security feature, because a processing core 102*a* may verify whether another circuit has modified the data transmitted on the CAN bus 20.

Alternatively, in various embodiments, the reception control circuit 5048 may be configured to maintain the reception enable signal RX_EN de-asserted when the transmission of data is enabled, e.g., in response to the configuration data stored to the control register(s) CTRL and/or the transmission enable signal TX_EN. In various embodiments, this behavior may also be programmable.

Accordingly, in the embodiments considered, the transmission of data occurs in response to the clock signal $CLK_2$, and the data are shifted out synchronously with this clock $CLK_2$. Conversely, the data received via the reception signal RXD may have a phase and/or a frequency deviation from this clock CLK$_2$. Substantially, a frequency deviation leads to accumulated phase shifts, i.e., a frequency deviation can be viewed as a sequence of phase shifts. In various embodiments, to compensate phase shifts the reception control circuit 5048 may be configured to adjust the sampling point of the received data based on detected bit transitions. Specifically, in various embodiments, is used for this purpose the synchronization signal SYNC.

Specifically, in various embodiments, the reception control circuit 5048 is configured to assert the synchronization signal SYNC in response to detecting a change of the logic level of the reception signal RXD, i.e., from the recessive level to the dominant level, e.g., in response to a falling edge, and/or from the dominant level to the recessive level, e.g., in response to a rising edge. For example, for this purpose, the reception control circuit 5048 may sample the reception signal RXD in response to the clock signal CLK$_{PRE}$ and assert the synchronization signal SYNC when a current sample is set to the dominant level and the previous sample is set to the recessive level and/or when a current sample is set to the recessive level and the previous sample is set to the dominant level.

As mentioned with respect to FIG. 9, the down-scaling circuit 5060 may be synchronized with the synchronization signal SYNC in order to generate the edge used to sample the reception signal RXD.

For example, in various embodiments, the down-scaling circuit 5060 is implemented with a counter configured to increase a count value CNT, and reset the count value CNT when a maximum count value is reached. Moreover, in order to synchronize the count value CNT with the synchronization signal SYNC, the counter CNT may be reset in response to determining that the synchronization signal SYNC is asserted.

Figure 12A:
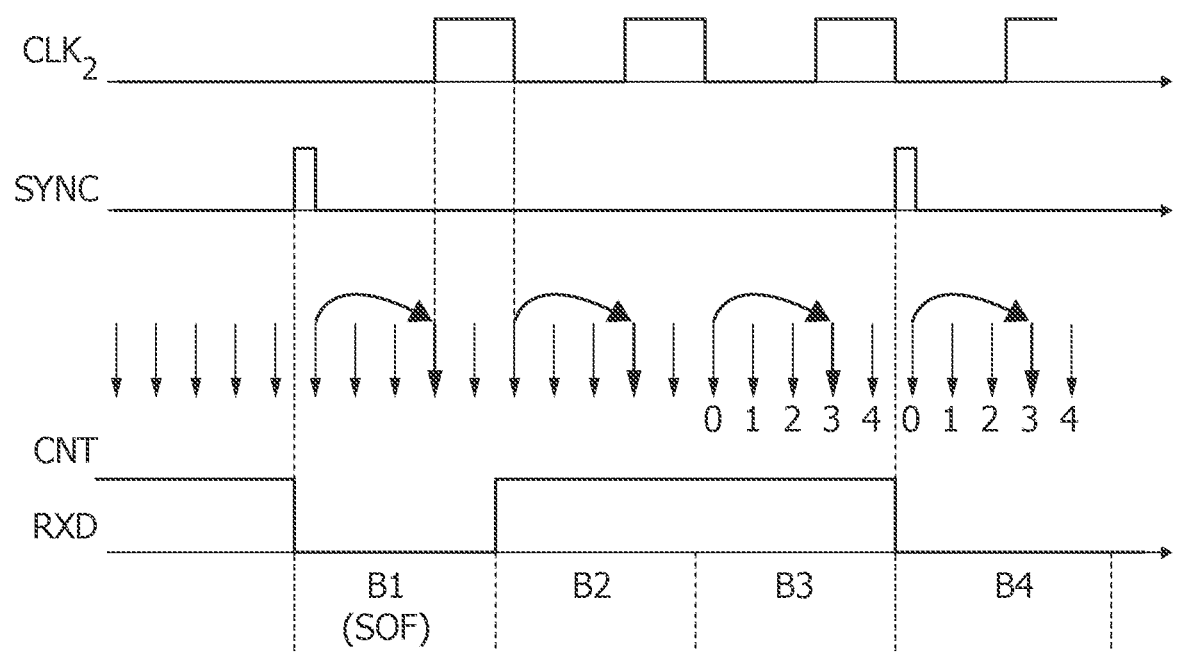
FIGS. 12A and 12B show embodiments of the operation of the hardware transmission and reception circuits of FIGS. 8 and 11.

For example, this is shown in FIG. 12A for the exemplary case that the dominant logic level is low and the receiver is synchronized only with the falling edge of the signal RXD. Specifically, in the example considered, the reception signal RX comprises in sequence the bits B1="0" (e.g., corresponding to the start-of-frame bis SOF), B1="1", B3="1" and B4="0".

Accordingly, in response to the change of the reception signal RXD from high to low for the bit B1, the synchronization signal SYNC is asserted, and thus the count value CNT is reset. Next the count value is increased at each clock cycle of the clock signal CLK$_{PRE}$, e.g., until a maximum value, e.g., 4, is reached, and then the count value CNT is again reset by the counter. Accordingly, in the embodiment considered, while sampling the recessive level, the count value CNT is not reset via the synchronization signal SYNC but only via the counter.

Accordingly, the clock signal CLK$_2$ may be asserted when the count value CNT reaches a given first value, such as 3, and may be de-asserted when the count value CNT reaches a given first value, such as 0.

Figure 12B:
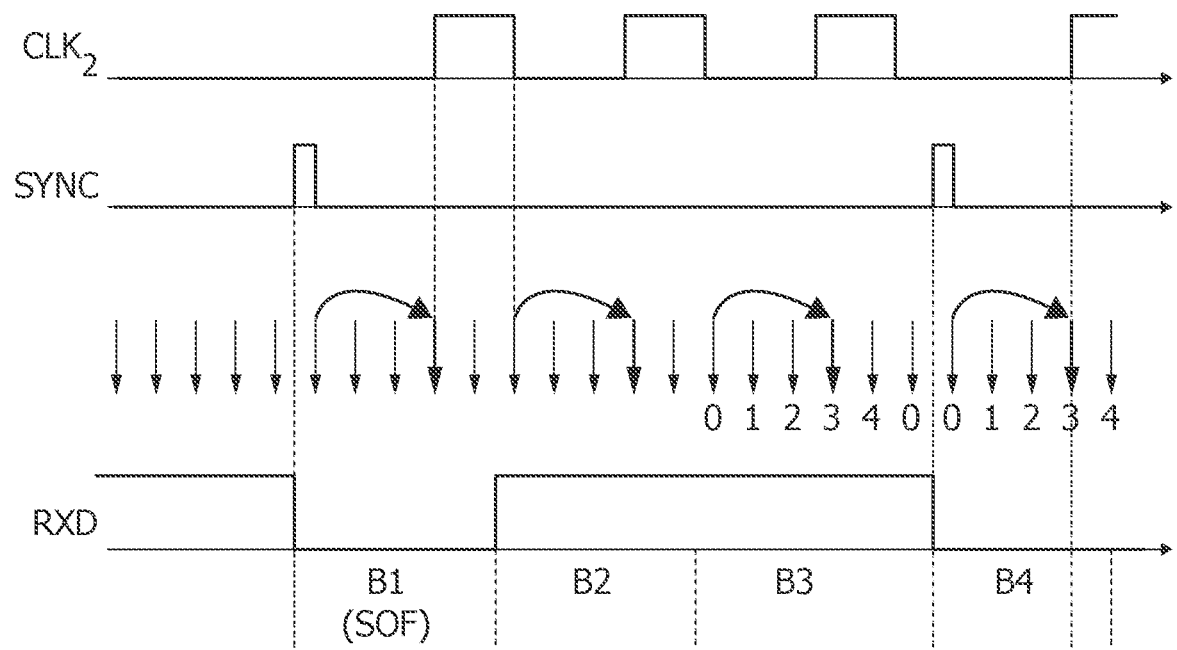

In this respect, FIG. 12B shows the case when the frequency of the reception signal RXD is slightly higher than the frequency of the clock signal CLK$_2$.

Specifically, at the end of the bit B3, the count value reaches the maximum value, e.g., 4, and the counter resets the count value to 0. However, then is received a falling edge, whereby the reception control circuit 5048 asserts the synchronization signal SYNC, whereby the counter CNT is again reset. Accordingly, in this case, the time between the falling edge and the next rising edge of the clock signal CLK$_2$ corresponds to four cycles, instead of the usual three cycles.

Generally, instead of resetting the counter 5060, the logic level of the synchronization signal SYNC may be used to determine the increase value of the counter. For example, by default the increase value may be set to 1. Conversely, when the signal SYNC is asserted when the count value is set to 0, the increase value of the counter may be set to zero, whereby the phase "0" is repeated twice. Conversely, when the signal SYNC is asserted when the count value has its maximum value minus 1 (e.g., 3), the increase value of the counter may be set to two, whereby the counter is reset indirectly.

As shown in FIG. 10, the clock signal CLKP$_{RE}$ (or another clock signal) may also be used to perform an oversampling of the received signal RXD (or RXD'). For example, in the embodiment considered, the hardware communication interface 504 comprises an oversampling circuit 5056, e.g., comprising a shift register having a plurality of bits, wherein the oversampling circuit 5056 stores a plurality of subsequent values of the reception signal RXD (or RXD'), and then generates the signal provided to the serial data input SDI of the register 5056 (or similarly the register 5042) based on the stored values. For example, in various embodiments, the oversampling circuit 5056 stores an odd number of bits, such as three, and the signal provided to the serial data input SDI of the register 5056 is corresponds to the logic value of the majority of bits.

In this respect, the inventors have observed, that such a resynchronization of the clock signal CLK$_2$ is particularly useful in case of the CAN FD Light protocol, because a significant number of bits may be transmitted.

Specifically, in various embodiments, the synchronization signal SYNC is generated in response to transitions of the reception signal RXD from the recessive level to the dominant level (such as a falling edge), but not in response to transitions from the dominant level to the recessive level (such as a rising edge). In fact, the inventors have observed, that the latter transitions may not be used always, because the transition is usually not very well defined due to the properties of the CAN bus physical layer. Specifically, when using a standard CAN physical layer according to ISO 11898-2 the dominant value (representing logical "0" on the CAN bus) is strongly driven by the CAN transceiver, while the recessive value is determined by the termination resistors (2×120 Ohms in parallel, i.e., 60 Ohms). Therefore, the dominant to recessive edge is not well driven and may be subject to ringing.

Moreover, in this respect is also relevant the bit-stuffing mechanism, which is not only relevant for determining the end-of-frame field EOF, but also ensures that a resynchronization is performed within a given maximum number of bits. Specifically, the bit stuffing ensures an edge after at most five bits and therefore at most after ten bits a falling edge occurs, which thus permits a resynchronization of the clock signal CLK$_2$.

Accordingly, the communication interface 50 may be used for both as transmitter of a CAN FD light frame and as a receiver of a CAN FD Light frame.

In this respect, in case of a CAN FD Light controller, i.e., a CAN FD Light master circuit, the processing core 102a provides first (via the slave interface 510 and/or the DMA channel DMA$_1$) a CAN FD Light frame to the hardware transceiver 504 (see the description of FIG. 13). In case the CAN FD Light frame includes a request expecting a response, the hardware transceiver 504 will then provide (via the slave interface 510 and/or the DMA channel DMA$_1$) a received CAN FD Light frame to the processing core 102a (see the description of FIG. 14).

Conversely, in case of a CAN FD Light slave circuit, the hardware transceiver 504 will provide first (via the slave interface 510 and/or the DMA channel $DMA_1$) a received CAN FD Light frame to the processing core 102a (see the description of FIG. 14). In case, the received CAN FD Light frame correspond to a request expecting a response, the processing core 102a may then provide (via the slave interface 510 and/or the DMA channel $DMA_1$) a response CAN FD Light frame to the hardware transceiver 504 (see the description of FIG. 13).

In this respect, the inventors have observed that the hardware communication interfaces 504 of FIGS. 8 and 10 have similarities with a Universal Asynchronous Receiver-Transmitter (UART) interface.

Specifically, also an UART interface comprises a shift register that shifts bits out to a transmission line or shifts bits received on the reception line into a shift register.

A typical UART interface is configured to send and receive fixed length UART frames comprising only a few data bits such as 1 byte (8 bits) or 2 bytes (16 bits). A typical UART frame comprises an initial start-of-frame bit, which is "0". To indicate the end of the byte at least one stop bit, which is "1", is appended. Sometimes a parity bit is included before the stop bit. For example, a descriptor of the operation mode 8N1 indicates eight bits (8), no parity (N) and one (1) stop bit are transmitted or received.

Accordingly, compared to the CAN FD Light frames, a UART frame has a fixed length of bits, e.g., 10 bits for the format 8N1 (including the start bits).

Accordingly, the inventors have observed that the same hardware communication interfaces 504, and more generally the same communication interface 50, may be used to support two modes: a CAN FD Light mode and an UART mode.

For example, for this purpose, the control register(s) may comprise a field or flag to store data indicating whether to use the CAN FD Light mode or the UART mode.

Specifically, in order to control a transmission operation, the transmitter control circuit 5046 is configured to determine, e.g., via a counter, whether the number corresponds to a number of requested bits. As mentioned before, the respective data may be stored to the control register(s). Accordingly, in the CAN FD mode, the respective number of requested bits indicates (e.g., corresponds to) the actual length of the CAN FD transmission frame, while in the UART mode the length of a UART frame may be set, e.g., to the number of data bits of the UART frame, e.g., to 8 or 16 bits. Generally, the number of bits for the UART mode may be fixed or programmable. In case also a parity bit has to be used, such a parity by may be calculated in hardware or preferably by the processing core 102a, which generates an UART frame comprising the data bits and the parity bit.

For example, in case of a processing system having at least 16 bits, a single packet TD1 is thus usually sufficient to transmit an UART frame. However, due to the fact that the UART frame dimension remains usually constant, a plurality of UART frames may be stored to the data TD1 . . . TDk, which thus may be transferred sequentially to the shift register 5040 or 5056, e.g., via the DMA channel $DMA_1$.

Accordingly, for the transmission side, it is sufficient to configure the number of bits to be transmitted, whereby the transmission control circuit 5046 asserts the transmission enable signal TX_EN for the time required in order to transmit the respective bits.

In this respect, the clock management circuit, in particular the pre-scaling circuit 5058, may also support higher scaling factors, because UART uses usually lower bit rates than the CAN FD Light protocol.

Conversely, in order to control a reception operation, the reception control circuit 5046 is configured to: in the CAN FD Light mode, assert the reception enable signal RX_EN once the start-of-frame bit SOF has been received and de-asserts the reception enable signal RX_EN in response to detecting the end-of-frame field EOF; in the UART mode, assert the reception enable signal RX_EN once the start-of-frame bit SOF has been received and de-asserts the reception enable signal RX_EN once the number of bits of the UART mode (as specified in the control register CTRL) has been received.

Specifically, in various embodiments, the reception control circuit 5048 uses the same counter in order to: in the CAN FD Light mode, detect the end-of-frame field EOF (8 consecutive bits set to the recessive level, e.g., high); and in the UART mode, to count the number of received bits.

Substantially, for this purpose, the counter may be configured to increase the respective count in response to the clock signal CLK2, and: in the CAN FD Light mode, reset the count value in response to the start-of-frame bit SOF and the other instants when the signal RXD has the recessive level; in the UART mode, reset the count value in response to the start-of-frame bit SOF.

Accordingly, in this case, the reception control circuit 5046 may de-assert the reception enable signal when the count value reaches a maximum value, which corresponds to: eight in the CAN FD Light mode, and the number of bits of the UART mode in the UART mode.

Accordingly, in various embodiments, the CAN FD Light frame (and similarly the UART frame) is assembled and disassembled in software. In case of a CAN FD Light frame, this includes the CRC calculation and stuff bit removal or insertion.

In various embodiments, the receiver control circuit may adjust the sample point in response to each falling edge of the reception signal RXD. This permits to follow phase shifts (or phase jitter) and frequency offsets in a long frame.

In the CAN FD Light mode of operation, the receiver control circuit detects the reception of eight consecutive received "1"s as end-of-frame identifier. Conversely, in the UART mode of operation, the receiver control circuit is configured to receive a predetermined number of bits (similar to the transmission control circuit).

In fact, the number of bits to be transmitted (both in the CAN FD Light mode and the UART mode) may be may be set via software. Generally, when activating the UART mode, the bit number may also correspond to a predetermined fixed number of bits, e.g., corresponding to the format 8N1.

In various embodiments, the transmission and/or reception shift registers have at least 675 bits (~85 bytes). This permits the transmission and reception of a CAN FD Light frame.

However, also smaller shift registers may be used, e.g., having word size of 8 or 16 bits, which per se is insufficient to store a complete CAN FD Light frame. However, the inventors have observed that by using a communication interface with a transmission data register DATATX (having the same word size) and a DMA transfer, the DMA channel $DMA_1$ is able to transfer a given data word of the transmission data TD1 . . . TDk from the memory 104b to the transmission data register DATATX, which is then transferred to the shift register 5040/5056 and transmitted via the transmission circuit of the interface 504. Moreover, while the interface 504 sequential transmits the bits of the current data word stored to the shift register 5040/5056, the DMA channel $DMA_1$ may transfer a new data word of the transmission data TD1 . . . TDk from the memory 104b to the transmission data register DATATX. Accordingly, by using an interface 50 supporting a DMA channel $DMA_1$ for the data to be transmitted, it is sufficient to correctly configure the DMA channel (such as an integrated or a general-purpose DMA channel) and the interface 50 in order to transmit all data words of the transmission data TD1 . . . TDk comprising the CAN FD Light frame prepared by the processing core 102a.

In this respect, in order to correctly transmit the seven end-of-frame bits EOF of the CAN FD Light frame, it is not necessary that the processing core 102a indeed adds seven end-of-frame bits EOF to the last data word TDk, but it is sufficient that the processing core 102a adds at least one bit having the recessive level. For example, in various embodiments, the processing core 102a is configured to fill the last bits of the last frame TDk (after the bit position corresponding to the bit AD) all with the logic level assigned to the recessive level, e.g., high, thereby ensuring that the signal TXD remains set to the recessive level when the transmission control circuit 5046 disables the shift register 5040/5056.

Similarly, in response to having stored a given number of bits to the shift register 5042/5056 (as signaled via the control circuit 5048), the received data may be transferred to a reception data register DATARX and then transferred via the DMA channel $DMA_2$ to the memory 104b. Accordingly, by using an interface 50 supporting a DMA channel $DMA_2$ for the received data, it is sufficient to correctly configure the DMA channel (such as an integrated or a general-purpose DMA channel) and the interface 50 in order to receive a CAN FD Light frame and store the respective reception data RD1 . . . RDk to the memory 104b.

Specifically, in this case, the reception control circuit 5048 is still configured to monitor the end-of-frame condition (eight consecutive bits set to the recessive level), irrespective of whether these bits belong indeed to the same data word.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
a transmission terminal configured to provide a transmission signal;
a reception terminal (RX) configured to receive a reception signal;
a microprocessor programmable via software instructions;
a memory controller configured to be connected to a memory;
a communication system connecting the microprocessor, the memory controller and a serial communication interface; and
the serial communication interface, supporting a controller area network flexible data-rate (CAN FD) Light mode of operation and a universal asynchronous receiver/transmitter (UART) mode of operation, wherein the serial communication interface comprises:

a control register configured to store data identifying a clock scaling factor, data identifying a requested number of bits and data identifying a mode of operation, the mode of operation indicating the CAN FD Light mode of operation or the UART mode of operation, wherein the control register is programmable via the microprocessor;
a clock management circuit configured to receive a clock signal and generate a down-scaled clock signal as a function of the clock scaling factor stored to the control register;
a transmission shift register configured to, when a transmission enable signal is asserted, generate the transmission signal by sequentially providing a content of the transmission shift register in response to the down-scaled clock signal, wherein the processing system is adapted to selectively transfer data from the microprocessor to the transmission shift register;
a transmission control circuit configured to:
  receive a start of transmission signal requesting transmission of data;
  in response to the start of transmission signal, assert the transmission enable signal;
  when the transmission enable signal is asserted, increase a transmission count value in response to the down-scaled clock signal;
  determine whether the transmission count value reaches the requested number of bits; and
  in response to determining that the transmission count value reaches the requested number of bits, de-assert the transmission enable signal;
a reception shift register configured to, when a reception enable signal is asserted, sequentially add a logic level of the reception signal to a content of the reception shift register in response to the down-scaled clock signal, wherein the processing system is adapted to selectively transfer data from the reception shift register to the microprocessor; and
a reception control circuit configured to:
  detect a falling edge in the reception signal;
  in response to detecting the falling edge in the reception signal, assert the reception enable signal;
  determine whether the data stored to the control register indicate the CAN FD Light mode of operation or the UART mode of operation;
  in response to determining that the data stored to the control register indicate the CAN FD Light mode of operation:
    when the reception enable signal is asserted and the reception signal is set to high, increase a first reception count value in response to the down-scaled clock signal;
    reset the reception count value each time the reception signal is set to low;
    determine whether the reception count value reaches eight; and
    in response to determining that the reception count value reaches eight, de-assert the reception enable signal; and
  in response to determining that the data stored to the control register indicate the UART mode of operation:
    when the reception enable signal is asserted, increase a second reception count value in response to the down-scaled clock signal;

determine whether the reception count value reaches the requested number of bits; and in response to determining that the reception count value reaches the requested number of bits stored to the control register, de-assert the reception enable signal.

2. The processing system according to claim 1, wherein the first reception count value and the second reception count value are provided by a same counter.

3. The processing system according to claim 1, wherein the transmission shift register and the reception shift register are implemented with a same shift register.

4. The processing system according to claim 1, wherein the microprocessor is configured to:

generate a transmission CAN FD Light frame;

determine a length of the transmission CAN FD Light frame;

program the control register in order to set the requested number of bits to the length of the transmission CAN FD Light frame, and the mode of operation to the CAN FD Light mode of operation; and provide the transmission CAN FD Light frame to the transmission shift register.

5. The processing system according to claim 4, wherein:

the transmission shift register has at least 675 bits and the microprocessor is configured to write the transmission CAN FD Light frame to the transmission shift register via the communication system; or the transmission shift register has a given word size and the processing system comprises a first Direct-Memory-Access (DMA) channel, wherein the microprocessor is configured to store the transmission CAN FD Light frame to the memory, and wherein the first DMA channel is configured to transfer packets of the given word size from the memory to the transmission shift register, thereby sequentially transferring the transmission CAN FD Light frame from the memory to the transmission shift register.

6. The processing system according to claim 1, wherein the microprocessor is configured to:

program the control register in order to set the mode of operation to the CAN FD Light mode of operation;

determine whether the reception control circuit de-asserts the reception enable signal;

in response to determining that the reception control circuit de-asserts the reception enable signal, obtain a reception CAN FD Light frame from the reception shift register; and analyze the reception CAN FD Light frame.

7. The processing system according to claim 6, wherein:

the reception shift register has at least 675 bits and the microprocessor is configured to read the reception CAN FD Light frame from the reception shift register via the communication system; or the reception shift register has a given word size and the processing system comprises a second DMA channel, wherein the second DMA channel is configured to transfer packets of the given word size from the reception shift register to the memory, thereby sequentially transferring the reception CAN FD Light frame from the reception shift register to the memory, and wherein the microprocessor is configured to read the reception CAN FD Light frame from the memory.

8. The processing system according to claim 1, wherein the transmission terminal and the reception terminal are connected to a CAN FD transceiver.

9. The processing system according to claim 1, wherein the clock management circuit is configured to synchronize the generation of the down-scaled clock signal with a synchronization signal, and wherein the reception control circuit is configured to generate the synchronization signal in response to rising and/or falling edges in the reception signal.

10. The processing system according to claim 1, wherein the processing system is disposed on an integrated circuit.

11. A device comprising:

a plurality of processing systems, each of the processing systems comprising:

a transmission terminal configured to provide a transmission signal;

a reception terminal (RX) configured to receive a reception signal;

a microprocessor programmable via software instructions;

a memory controller configured to be connected to a memory;

a communication system connecting the microprocessor, the memory controller and a serial communication interface; and the serial communication interface, supporting a controller area network flexible data-rate (CAN FD) Light mode of operation and a universal asynchronous receiver/transmitter (UART) mode of operation, wherein the serial communication interface comprises:

a control register configured to store data identifying a clock scaling factor, data identifying a requested number of bits and data identifying a mode of operation, the mode of operation indicating the CAN FD Light mode of operation or the UART mode of operation, wherein the control register is programmable via the microprocessor;

a clock management circuit configured to receive a clock signal and generate a down-scaled clock signal as a function of the clock scaling factor stored to the control register;

a transmission shift register configured to, when a transmission enable signal is asserted, generate the transmission signal by sequentially providing a content of the transmission shift register in response to the down-scaled clock signal, wherein the processing system is adapted to selectively transfer data from the microprocessor to the transmission shift register;

a transmission control circuit configured to:

receive a start of transmission signal requesting transmission of data;

in response to the start of transmission signal, assert the transmission enable signal;

when the transmission enable signal is asserted, increase a transmission count value in response to the down-scaled clock signal;

determine whether the transmission count value reaches the requested number of bits; and in response to determining that the transmission count value reaches the requested number of bits, de-assert the transmission enable signal;

a reception shift register configured to, when a reception enable signal is asserted, sequentially add a logic level of the reception signal to a content of the reception shift register in response to the down-scaled clock signal, wherein the processing system is adapted to selectively transfer data from the reception shift register to the microprocessor; and
a reception control circuit configured to:
detect a falling edge in the reception signal;
in response to detecting the falling edge in the reception signal, assert the reception enable signal;
determine whether the data stored to the control register indicate the CAN FD Light mode of operation or the UART mode of operation;
in response to determining that the data stored to the control register indicate the CAN FD Light mode of operation:
when the reception enable signal is asserted and the reception signal is set to high, increase a first reception count value in response to the down-scaled clock signal;
reset the reception count value each time the reception signal is set to low;
determine whether the reception count value reaches eight; and
in response to determining that the reception count value reaches eight, de-assert the reception enable signal; and
in response to determining that the data stored to the control register indicate the UART mode of operation:
when the reception enable signal is asserted, increase a second reception count value in response to the down-scaled clock signal;
determine whether the reception count value reaches the requested number of bits; and
in response to determining that the reception count value reaches the requested number of bits stored to the control register, de-assert the reception enable signal; and
a further communication system communicatively connecting the processing systems.

12. The device of claim 11, wherein the device is a vehicle.

13. A method of operating a processing system comprising a transmission terminal configured to provide a transmission signal, a reception terminal (RX) configured to receive a reception signal, a microprocessor programmable via software instructions, a memory controller configured to be connected to a memory, a communication system connecting the microprocessor, the memory controller and a serial communication interface, and the serial communication interface, supporting a controller area network flexible data-rate (CAN FD) Light mode of operation and a universal asynchronous receiver/transmitter (UART) mode of operation, the serial communication interface comprising a control register, a clock management circuit, a transmission shift register, and a reception shift register, the method comprising:
programming the control register in order to set the mode of operation to the CAN FD Light mode of operation;
during a transmission phase:
generating a transmission CAN FD Light frame;
determining a length of the transmission CAN FD Light frame;
programming the control register in order to set a requested number of bits to the length of the transmission CAN FD Light frame; and
providing the transmission CAN FD Light frame to the transmission shift register; and during a reception phase:
determining whether a reception control circuit de-asserts a reception enable signal;
in response to determining that the reception control circuit de-asserts the reception enable signal, obtaining a reception CAN FD Light frame from the reception shift register; and
analyzing the reception CAN FD Light frame.

14. The method according to claim 13, wherein the transmission shift register and the reception shift register are implemented with a same shift register.

15. The method according to claim 13, further comprising:
storing, by the control register, data identifying a clock scaling factor, data identifying the requested number of bits and data identifying the mode of operation, and the control register being programmable via the microprocessor.

16. The method according to claim 15, further comprising:
generating a down-scaled clock signal as a function of a received clock signal and the clock scaling factor stored to the control register;
generating a synchronization signal in response to rising and/or falling edges in the reception signal; and
synchronizing the generated down-scaled clock signal with the synchronization signal.

17. The method according to claim 16, further comprising:
in response to a transmission enable signal being asserted, generating, by the transmission shift register, the transmission signal by sequentially providing a content of the transmission shift register in response to the down-scaled clock signal; and
in response to the reception enable signal being asserted, sequentially adding, by the reception shift register, a logic level of the reception signal to a content of the reception shift register in response to the down-scaled clock signal.

18. The method according to claim 13, wherein:
the transmission shift register has at least 675 bits and the method comprises writing the transmission CAN FD Light frame to the transmission shift register via the communication system; or
the transmission shift register has a given word size and the method comprises storing the transmission CAN FD Light frame to the memory, transferring, by a first Direct-Memory-Access (DMA) channel, packets of the given word size from the memory to the transmission shift register, thereby sequentially transferring the transmission CAN FD Light frame from the memory to the transmission shift register.

19. The method according to claim 13, wherein:
the reception shift register has at least 675 bits and the method comprises reading the reception CAN FD Light frame from the reception shift register via the communication system; or
the reception shift register has a given word size and the method comprises transferring, by a second DMA channel, packets of the given word size from the reception shift register to the memory, thereby sequentially transferring the reception CAN FD Light frame from the reception shift register to the memory, and reading the reception CAN FD Light frame from the memory.

20. The method according to claim 13, wherein the transmission terminal and the reception terminal are connected to a CAN FD transceiver.

\* \* \* \* \*